US012613943B1

(12) United States Patent
Bhat et al.

(10) Patent No.: US 12,613,943 B1
(45) Date of Patent: Apr. 28, 2026

(54) EMBEDDING AND STORING A TRACEABLE WATERMARK IN MULTI-MODAL DIGITAL DATA

(71) Applicant: Citibank, N.A., New York, NY (US)

(72) Inventors: Ganesh Prasad Bhat, West Orange, NJ (US); James Myers, New York, NY (US); Ryan Bergeron, New York, NY (US); Prashant Praveen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/366,336

(22) Filed: Oct. 22, 2025

(51) Int. Cl.
*G06F 21/16* (2013.01)
*G06F 16/951* (2019.01)
*H04L 9/00* (2022.01)
*G06T 1/00* (2006.01)

(52) U.S. Cl.
CPC ............ *G06F 21/16* (2013.01); *G06F 16/951* (2019.01); *H04L 9/50* (2022.05); *G06T 1/005* (2013.01)

(58) Field of Classification Search
CPC ......... G06F 21/16; G06F 16/951; H04L 9/50; G06T 1/005
See application file for complete search history.

(56) References Cited

U.S. PATENT DOCUMENTS 8,340,348 B2 12/2012 Petrovic et al.
2014/0119593 A1 * 5/2014 Filler ................... G06T 1/0064
382/100

2025/0094546 A1 * 3/2025 Huang .................... H04L 63/12
2025/0209194 A1 6/2025 Crabtree et al.
2025/0254048 A1 * 8/2025 Smith ..................... G06T 13/40
2025/0291909 A1 * 9/2025 Fortkort ............... G06F 21/554
2025/0370729 A1 * 12/2025 Lawler ................ G06F 11/3636

FOREIGN PATENT DOCUMENTS

CN 114756834 A * 7/2022 .......... H04L 63/126
CN 114359009 B * 10/2023 ............ G06T 1/005
CN 119741182 A * 4/2025
EP 1130490 A2 9/2001

* cited by examiner

*Primary Examiner* — Trong H Nguyen
(74) *Attorney, Agent, or Firm* — Perkins Coie LLP; Sumedha Ahuja; Willa Wu

(57) ABSTRACT

The systems and methods disclosed herein embed and store traceable watermarks across multiple data modalities including text, image, audio, video, and structured data. The systems and methods disclosed herein receive an input dataset and generate unique watermark patterns for each data modality using cryptographic hash functions applied to dataset identifiers. The watermark patterns include parameters that provide instructions to watermark the input dataset. Watermarking includes modifying discrete data values, relationships, or arrangements within the original dataset at predetermined locations. The watermarked dataset is used to generate a hierarchical fingerprint structure including multiple levels of cryptographic hash identifiers that represent different portions of the data (e.g., at varying granularities). Both the watermark patterns and hierarchical fingerprints are stored in a distributed database accessible through a decentralized network, thus enabling authorized computing devices to verify data provenance and detect potential misappropriation across heterogeneous digital content types.

20 Claims, 14 Drawing Sheets

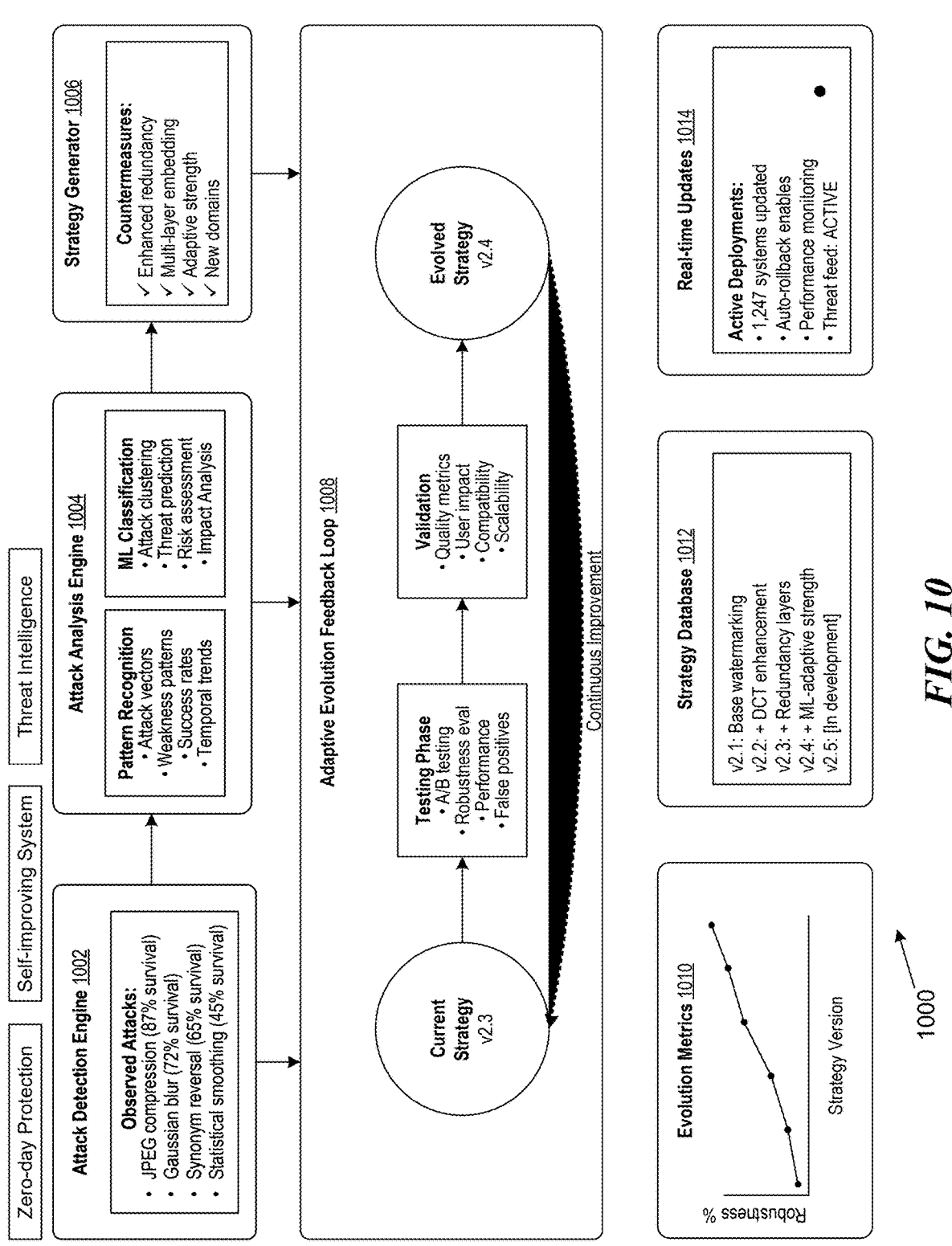

Zero-day Protection     Self-improving System     Threat Intelligence

Strategy Generator 1006

Countermeasures:
✓ Enhanced redundancy
✓ Multi-layer embedding
✓ Adaptive strength
✓ New domains

Attack Analysis Engine 1004

Pattern Recognition
• Attack vectors
• Weakness patterns
• Success rates
• Temporal trends

ML Classification
• Attack clustering
• Threat prediction
• Risk assessment
• Impact Analysis

Attack Detection Engine 1002

Observed Attacks:
• JPEG compression (87% survival)
• Gaussian blur (72% survival)
• Synonym reversal (65% survival)
• Statistical smoothing (45% survival)

Adaptive Evolution Feedback Loop 1008

Current Strategy v2.3

Evolved Strategy v2.4

Testing Phase
• A/B testing
• Robustness eval
• Performance
• False positives

Validation
• Quality metrics
• User impact
• Compatibility
• Scalability

Continuous Improvement

Strategy Database 1012 v2.1: Base watermarking
v2.2: + DCT enhancement
v2.3: + Redundancy layers
v2.4: + ML-adaptive strength
v2.5: [In development]

Real-time Updates 1014

Active Deployments:
• 1,247 systems updated
• Auto-rollback enables
• Performance monitoring
• Threat feed: ACTIVE

Evolution Metrics 1010

Robustness %

Strategy Version

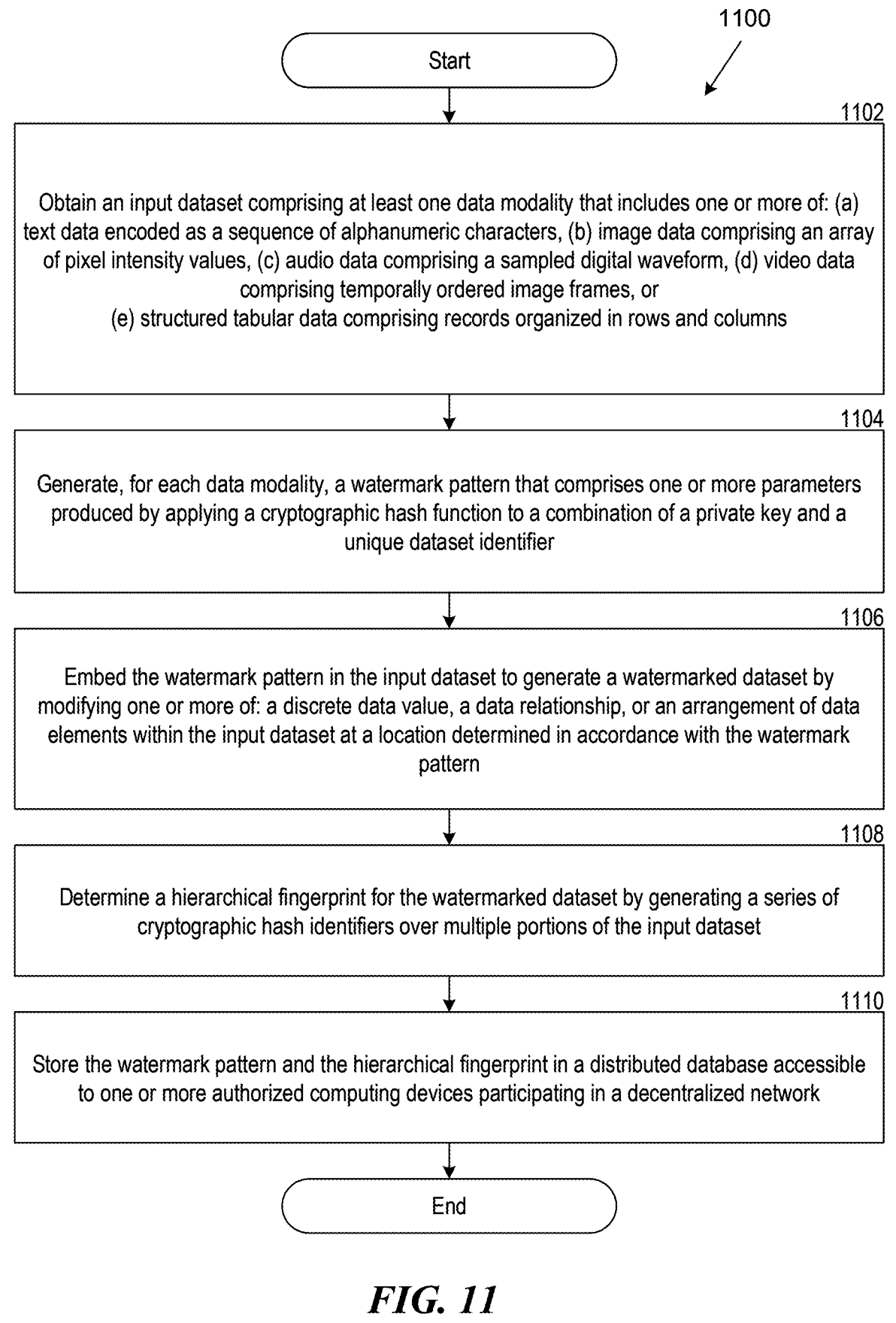

Start

Obtain an input dataset comprising at least one data modality that includes one or more of: (a) text data encoded as a sequence of alphanumeric characters, (b) image data comprising an array of pixel intensity values, (c) audio data comprising a sampled digital waveform, (d) video data comprising temporally ordered image frames, or
(e) structured tabular data comprising records organized in rows and columns

1104

Generate, for each data modality, a watermark pattern that comprises one or more parameters produced by applying a cryptographic hash function to a combination of a private key and a unique dataset identifier

1106

Embed the watermark pattern in the input dataset to generate a watermarked dataset by modifying one or more of: a discrete data value, a data relationship, or an arrangement of data elements within the input dataset at a location determined in accordance with the watermark pattern

1108

Determine a hierarchical fingerprint for the watermarked dataset by generating a series of cryptographic hash identifiers over multiple portions of the input dataset

1110

Store the watermark pattern and the hierarchical fingerprint in a distributed database accessible to one or more authorized computing devices participating in a decentralized network End

*FIG. 11*

EMBEDDING AND STORING A TRACEABLE WATERMARK IN MULTI-MODAL DIGITAL DATA

BACKGROUND

Digital data includes information (e.g., stored in binary format) that can be processed by computing systems, including text data, image data, audio data, video data, structured data, and so forth. Multi-modal datasets combine two or more of these different data types within a single collection, such as a research dataset that includes both textual descriptions and corresponding images, or a multimedia presentation that includes text, audio, and video elements. Multi-modal datasets are increasingly common in modern digital environments where information is captured and stored across multiple formats. However, content owners struggle to detect unauthorized usage when their datasets are copied and redistributed, especially when the dataset includes multiple data modalities.

BRIEF DESCRIPTION OF THE DRAWINGS

FIG. 10 shows a schematic illustrating an example environment of a feedback loop implemented within a data watermarking platform, in accordance with some implementations of the present technology.

FIG. 11 is a flow diagram illustrating an example process of embedding and storing a traceable watermark in multi-modal digital data using a data watermarking platform, in accordance with some implementations of the present technology.

Figure 1:
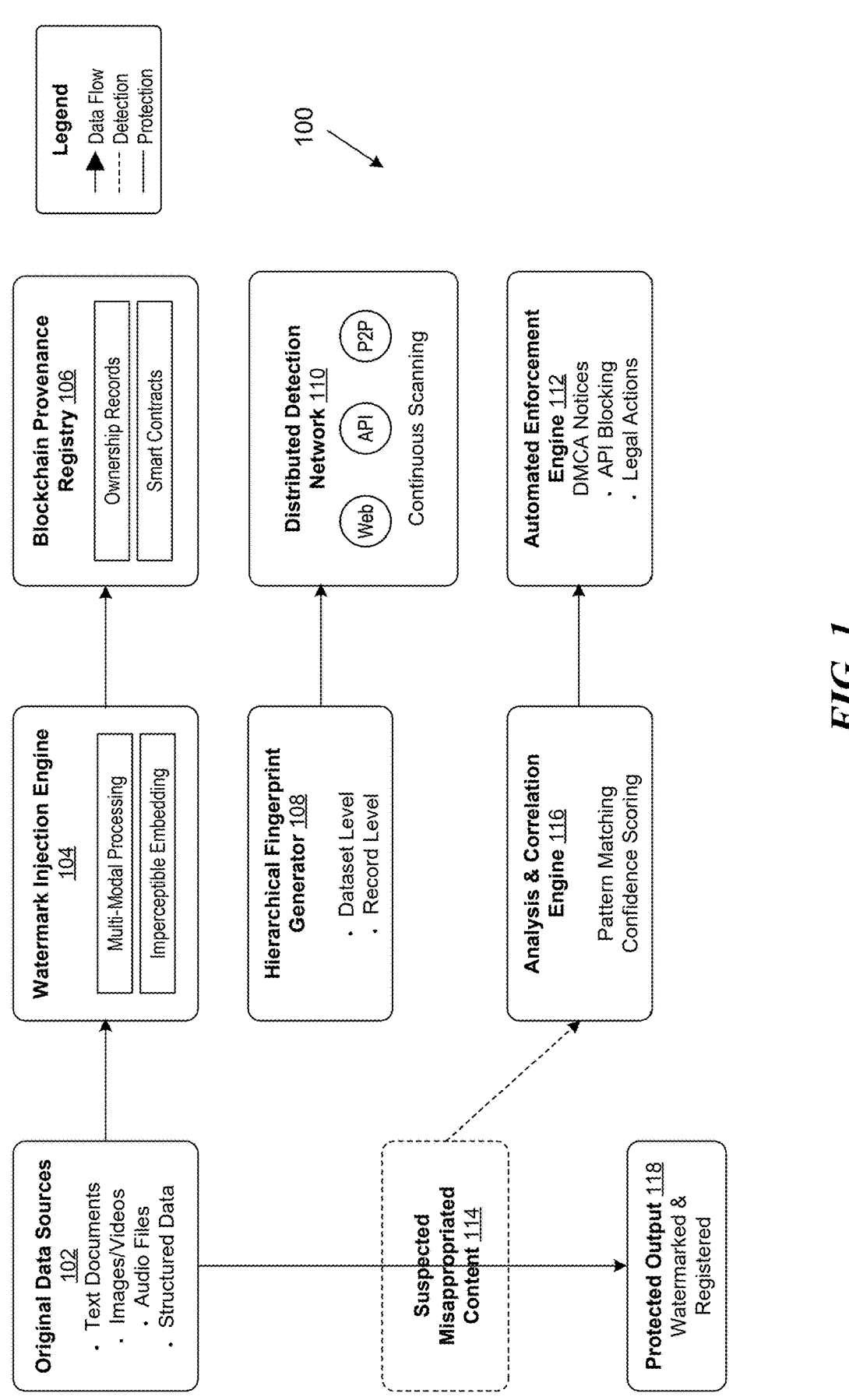
FIG. 1 shows a schematic illustrating an example environment of an architecture of a data watermarking platform, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The digital nature of modern content enables straightforward replication and distribution processes once access to content has been established. When users obtain legitimate access to digital datasets through authorized channels, the underlying computing infrastructure provides standard functionality for copying files to local storage, transferring content to external devices, or uploading materials to different platforms and repositories. Digital content can be replicated with high fidelity through standard file system operations, network transfers, or cloud synchronization services. Users may redistribute content through various technical means including email attachments, file-sharing protocols, peer-to-peer networks, public repositories, social media platforms, or direct device-to-device transfers. The binary nature of digital information enables unlimited reproduction without degradation, meaning a single digital file can generate identical copies that retain the original data characteristics and functionality across different storage systems and computing environments.

However, this ease of replication therefore creates significant challenges in tracking the provenance and detecting unauthorized usage of multi-modal datasets across distributed digital environments. Existing plagiarism and content matching tools typically rely on exact or near-exact matching algorithms that typically use exact or near-exact matching algorithms to compute hash values using cryptographic functions (MD5, SHA-1, or SHA-256) and generate fixed-length digital fingerprints from input data or perform byte-by-byte comparisons that sequentially examine each binary digit in files to identify identical sequences. Both approaches require substantial portions of content to remain unchanged to successfully detect unauthorized usage (i.e., plagiarism). These approaches further fail to detect more complex transformations, such as text rewriting operations that substitute words with synonyms or rephrase sentences while maintaining semantic meaning.

Further, while conventional access control systems typically restrict who can view data through login credentials and role-based access controls, conventional access control systems are unable to prevent authorized users from copying and redistributing content once legitimate access has been granted to the underlying digital files through standard operating system interfaces. This creates a security gap where data theft often occurs through insider threats involving employees or contractors who exploit their legitimate access privileges to copy sensitive datasets to external storage devices or upload content to unauthorized repositories or through compromised credentials where attackers gain access using stolen authentication tokens or passwords obtained through phishing attacks or credential-stuffing operations. This results in unauthorized distribution that bypasses perimeter security measures set by the conventional access control systems.

In addition, modern datasets often combine multiple modalities including text documents stored as character sequences, images represented as pixel arrays with RGB or grayscale values, audio recordings encoded as digital waveforms with specific sampling rates and bit depths, and structured data organized in relational database tables with defined schemas and data types. However, current data protection systems typically address only single modalities through modality-specific techniques such as text-based plagiarism detection via n-gram analysis. This limitation leaves composite datasets vulnerable to selective extraction attacks where unauthorized users can isolate and redistribute individual data modalities using format-specific extraction tools or cross-modal correlation attacks where relationships between different data types can be evaluated to circumvent protections that operate independently on each content type without considering inter-modal dependencies.

Conventional watermarking techniques typically embed identification markers through basic modifications such as least significant bit alterations in image pixels or invisible character insertions in text documents, but these approaches can be circumvented by common transformations such as those that quantize data values and discard high-frequency information, re-encode content using different standards and bit representations, and so forth. These transformations occur routinely during content distribution through social media platforms, content delivery networks, and file-sharing services that automatically optimize (or otherwise transform) content for bandwidth efficiency and device compatibility purposes.

Even when misappropriation is suspected, proving original ownership and establishing the chain of derivation remain challenging without tamper-proof records that demonstrate objective proof of the provenance of the content. Conventional documentation approaches rely on file timestamps that can be modified through operating system commands, metadata fields that can be altered using standard editing tools, or digital signatures that may not withstand content transformations such as format conversion or compression operations. This creates evidentiary gaps that prevent, for example, effective enforcement of intellectual property rights that use chain-of-custody documentation.

Attempting to create a system to determine provenance of multi-modal digital data in view of the available conventional approaches created significant technological uncertainty. Creating such a system requires addressing several unknowns in conventional watermarking systems, including the transformation resilience constraints in existing watermarking systems. To overcome the technological uncertainties, the inventors systematically evaluated multiple design alternatives. For example, the inventors evaluated systems that relied on manual approaches to monitor data misuse. Manual monitoring for data misuse across the internet typically requires human operators to systematically examine many (e.g., millions) of websites, social media platforms, file-sharing repositories, and peer-to-peer networks that host user-generated content and facilitate data exchange across global networks operating continuously. However, this approach was evaluated to be impractical given the scale of digital content distribution, where terabytes of new content are uploaded daily to data platforms.

The inventors also systematically evaluated conventional content fingerprinting systems that generate perceptual hash signatures for individual data modalities using modality-specific operations. However, these conventional fingerprinting approaches operate independently on each data type without establishing relationships between different modalities within the same dataset, making them vulnerable to selective extraction attacks where unauthorized users can redistribute portions of multi-modal collections while evading detection. Additionally, conventional content fingerprinting systems typically store identification signatures in centralized databases that lack immutable provenance records, creating vulnerabilities where fingerprint databases can be compromised or manipulated.

As such, the inventors have developed systems (hereinafter "data watermarking platform") and related methods to embed and store traceable watermarks across multiple data modalities including text, image, audio, video, and structured data. The data watermarking platform receives an input dataset and generates unique watermark patterns for each data modality using cryptographic hash functions applied to dataset identifiers. The watermark patterns include parameters that provide instructions to watermark the input dataset. Watermarking includes modifying discrete data values (e.g., individual pixel intensity values in images, character substitutions in text documents, amplitude adjustments in audio waveforms), relationships (e.g., correlations between database columns, spatial arrangements between image regions, temporal synchronization between audio and video tracks), and/or arrangements within the original dataset at predetermined locations (e.g., specific paragraph positions in text files, frequency bands in audio spectrograms, frame sequences in video content, row positions in structured data tables). The watermarked dataset is used to generate a hierarchical fingerprint structure including multiple levels of cryptographic hash identifiers that represent different portions of the data at varying granularities (e.g., dataset-level fingerprints representing entire multi-modal collections, segment-level fingerprints representing logical sections such as chapters in documents or scenes in videos, record-level fingerprints representing individual data entries such as database rows or image metadata). Both the watermark patterns and hierarchical fingerprints can be stored in a distributed database accessible through a decentralized network, thus enabling authorized computing devices to verify data provenance and detect potential misappropriation across heterogeneous digital content types.

In some implementations, when converting from one modality (e.g., text data) to another modality (e.g., video data), the data watermarking platform can transform the data between modalities to detect presence of the watermark. For example, the data watermarking platform can generate a direct transcription of a video's audio track and apply cryptographic operations to the resulting text to enable watermarking and provenance tracking across both modalities. Additionally, the data watermarking platform can identify and encode immutable data elements, such as financial transaction numbers or other fixed-value records, by embedding watermark signals directly into these values to ensure that the watermark persists even when other aspects of the dataset are transformed or re-encoded.

The data watermarking platform addresses the technical problems of conventional systems by embedding transformation-resilient watermarks. Unlike conventional approaches that rely on exact matching algorithms requiring substantial portions of content to remain unchanged, the data watermarking platform embeds watermarks using modality-specific operations that withstand transformations encountered during content distribution of the modality. By establishing contextual relationships between different data types within the same dataset, the data watermarking platform reduces selective extraction attacks where unauthorized users attempt to redistribute individual modalities while evading detection.

Further, unlike conventional documentation approaches that rely on modifiable file timestamps and metadata fields, the data watermarking platform can store cryptographic hash identifiers, watermark embedding parameters, and ownership information in distributed ledger records (e.g., blockchain, federated ledger) that are unable to be altered or deleted once committed to the blockchain. In some implementations, smart contracts deployed on the blockchain are enabled to automatically enforce licensing terms and trigger predetermined responses when violations are detected, thereby reducing the need for manual monitoring across internet-scale content distribution networks. A distributed detection network within the data watermarking platform continuously scans web platforms, API endpoints, and peer-to-peer networks to identify embedded watermarks despite content modifications and can generate evidence packages (e.g., confidence scores) of flagged content.

While the current description provides examples related to large language models (LLMs) and agents, one of skill in the art would understand that the disclosed techniques can apply to other forms of machine learning or algorithms, including unsupervised, semi-supervised, supervised, and reinforcement learning techniques. For example, the disclosed data watermarking platform can evaluate model outputs from support vector machine (SVM), k-nearest neighbor (KNN), decision-making, linear regression, random forest, naïve Bayes, or logistic regression algorithms and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Watermarking Platform

FIG. 1 shows a schematic illustrating an example environment 100 of an architecture of a data watermarking platform, in accordance with some implementations of the present technology. The environment 100 can be implemented using components of example computer system 1300 illustrated and described in more detail with reference to FIG. 13. Likewise, implementations of example environment 100 can include different and/or additional components or can be connected in different ways.

The data watermarking platform receives multi-modal digital content from original data sources 102, which can include data such as text encoded as alphanumeric character streams, images captured as matrices of pixel intensity values, sequences of audio samples representing waveforms, temporally indexed video frame arrays, and structured tabular data conforming to relational or flat-file formats. The digital content from the original data sources 102 is ingested by a watermark injection engine 104 that embeds watermarks into the received content to generate a protected output 118. The watermark injection engine 104 applies, for example, modality-specific embedding transformations to modify discrete data values, relationships, or arrangements within the digital content. Upon ingesting the data sources 102, the watermark injection engine 104 applies a series of deterministic, modality-specific transformation algorithms that alter one or more discrete data values (e.g., pixel bits, text tokens, numerical fields), change relationships (e.g., spatial positioning of image features, syntactic arrangement in text), or rearrange data elements (e.g., ordering of video frames, table columns). The transformations are parameterized by cryptographically derived keys, as further discussed with reference to FIGS. 2-10.

The watermark injection engine 104 can be coupled to a blockchain provenance registry 106 that maintains ownership records and executes smart contracts (i.e., structured sets of instructions) for automated enforcement. The blockchain provenance registry 106 stores cryptographic hash identifiers, watermark parameters, and ownership metadata in immutable ledger records. A hierarchical fingerprint generator 108 can generate a fingerprint of the watermarked data at multiple granularity levels by, for example, generating unique identifiers for an entire dataset (dataset-level fingerprint), subdivisions such as chapters or image regions (segment-level fingerprint), and individual elements like text tokens or tabular records (record-level fingerprint), using cryptographic hash functions applied to corresponding portions of the watermarked content.

The hierarchical fingerprint generator 108 is coupled to a distributed detection network 110 that performs continuous scanning operations across web platforms, API endpoints, and/or peer-to-peer networks. The distributed detection network 110 deploys crawler nodes that collect observed digital content (e.g., suspected misappropriated content 114). The data watermarking platform can determine a correlation between the suspected misappropriated content 114 using an analysis and correlation engine 116 that performs pattern matching operations to generate confidence scores. The analysis and correlation engine 116 compares detected watermark patterns against stored patterns in the blockchain provenance registry 106. The analysis and correlation engine 116 can be coupled to an automated enforcement engine 112 that executes response protocols in accordance with digital protections, such as transmitting standardized take-down requests (e.g., DMCA), blocking access through network control messages to offending APIs, or initiating legally admissible forensic documentation actions.

Figure 2:
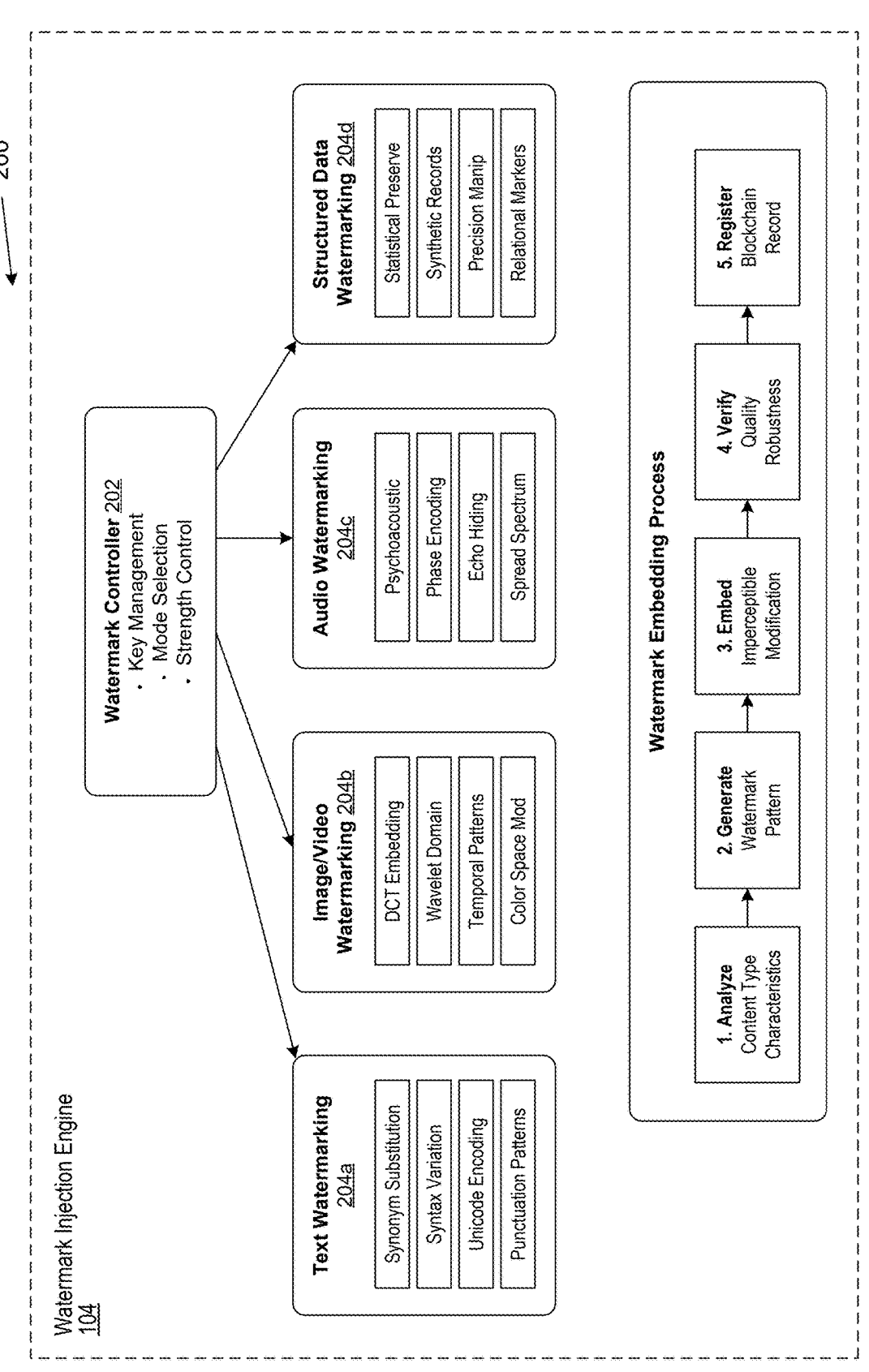
FIG. 2 shows a schematic illustrating an example environment of a watermark injection engine within a data watermarking platform, in accordance with some implementations of the present technology.

FIG. 2 shows a schematic illustrating an example environment 200 of a watermark injection engine 104 within a data watermarking platform, in accordance with some implementations of the present technology. The environment 200 can be implemented using components of example computer system 1300 illustrated and described in more detail with reference to FIG. 13. Likewise, implementations of example environment 200 can include different and/or additional components or can be connected in different ways.

The watermark injection engine 104 can be controlled by a watermark controller 202. The watermark controller 202 can be used to manage the watermarking workflow of a particular data (e.g., original data sources 102 in FIG. 1). For example, the watermark controller 202 can select a particular watermarking engine 204 (e.g., a text watermarking engine 204a, an image/video watermarking engine 204b, an audio watermarking engine 204c, a structured data watermarking engine 204d, and so forth) to transmit the data to via a data modality associated with the data (e.g., transmit text data to a text watermarking engine 204a). Further examples of operations performed by the watermarking engines 204 are described in further detail with reference to FIGS. 5-7. In response to control signals received from the watermark controller 202, watermark injection engine 104 applies a predetermined operation or set of operations to modify the incoming data payload. For each data segment within the original data sources, the watermark injection engine 104 applies identification sequences or patterns that conform to modality-specific encoding standards, such as modifying least significant bits for images, altering token sequences for text streams, or embedding scale-invariant spectrogram signatures in audio data.

The watermark controller 202, in some implementations, generates a watermark pattern and/or a parameter of the watermark pattern (e.g., a degree of strength). The watermark controller 202 operates as a programmable logic unit responsible for managing operational parameters throughout the watermarking workflow. In some implementations, the watermarking engines 204 themselves generate the watermark pattern and/or a parameter of the watermark pattern. The watermarking engines 204 embed the watermark in accordance with the watermark pattern. The workflows used to embed the watermark can differ based on a data modality associated with a particular watermarking engine.

The watermarking engines 204 refer to a network of modality-specific processing units that operate to embed watermarks in text, image/video, audio, and/or structured data. Each watermarking engine 204 operates using domain-specific transformations. The text watermarking engine 204a receives or generates a watermark key using a cryptographic hash function, such as SHA-256, applied to concatenated identifiers such as owner ID, timestamp, or a random nonce. The text watermarking engine 204a evaluates each segment of the text (e.g., word or phrase) to match terms indicated by the watermark key (e.g., matching a position indicated by the watermark key) to synonym sets drawn from a reference linguistic database. Using the watermark key as a seed for a pseudo-random function, the text watermarking engine 204a can select particular synonyms and substitute them to embed an encrypted pattern without altering the semantic meaning of the content. In some implementations, the text watermarking engine 204a applies invisible Unicode characters or sequence permutations to encode the watermark at the byte level. The transformation(s) produces a statistically unique pattern mapped to the cryptographic key, making it retrievable only through an authorized extraction function. Further examples of operations performed by the text watermarking engine 204a are described in further detail with reference to FIG. 5.

The image/video watermarking engine 204b processes bitmap or compressed visual data by embedding digital watermark sequences into pixel arrays, frequency coefficients, scalable vector elements, and so forth. For example, the image/video watermarking engine 204b generates a deterministic watermark pattern through a cryptographic hash applied to the concatenation of a private key and a unique dataset identifier. This pattern is mapped to specific pixel locations or frequency components within the image. The engine transforms the input image from the spatial domain into the frequency domain (e.g., using the discrete cosine transform (DCT)) to produce a matrix of coefficients that quantitatively describe local and global frequency features. Targeting mid-frequency DCT coefficients, which balance perceptual invisibility with robustness against compression artifacts, the image/video watermarking engine 204b applies an embedding formula (e.g., such that each coefficient $(C(u,v))$ is altered to $(C'(u,v)=C(u,v)+\alpha*W(u,v))$, where $(W(u,v))$ is the watermark pattern value indexed by the cryptographic key and $(\alpha)$ is a statistically calibrated scaling factor controlling a degree of watermark strength. After the watermark pattern is applied, the image can be transformed back into the spatial domain, resulting in an output that retains the watermark embedded at a signal level (e.g., that is undetectable to typical human vision). Further examples of operations performed by the image/video watermarking engine 204b are described in further detail with reference to FIG. 6.

The audio watermarking engine 204c receives waveform data and performs one or more operations within a temporal sequence or spectral decomposition of the audio signal. The audio watermarking engine 204c derives a watermark key by hashing owner identifiers, timestamps, and/or nonces, which determines the positions and content of the watermark pattern. The audio watermarking engine 204c evaluates the incoming audio to identify time-frequency regions masked to human hearing due to the presence of dominant sounds. Into these regions, the audio watermarking engine 204c modulates amplitude and frequency values to encode watermark bits without producing perceptible distortion. In some implementations, the audio watermarking engine 204c shifts phase relationships between select frequency components in accordance with the watermark pattern to produce alterations that remain unchanged under audio compression and digital signal transformations.

The structured data watermarking engine 204d applies watermark signals to structured datasets by manipulating reserved fields, statistical distributions, or synthetic data record generation. To inject watermarks while maintaining statistical integrity, the structured data watermarking engine 204d programmatically alters the least significant digits of selected numeric values, such as sensor outputs, in accordance with a binary watermark pattern mapped directly from the cryptographic key and dataset identifier. For example, if the watermark pattern dictates a binary "1" for a particular row, a numerical value such as "125,430.00" is programmatically incremented to "125,430.01" to ensure that the alteration remains statistically invisible and undetectable through particular statistical transformations but recoverable using a particular extraction logic. The structured data watermarking engine 204d can ensure that the mean, standard deviation, and other statistics of the modified data remain within controlled tolerances—e.g., within ±0.01% of their original values. Further examples of operations performed by the structured data watermarking engine 204d are described in further detail with reference to FIG. 7.

Figure 3:
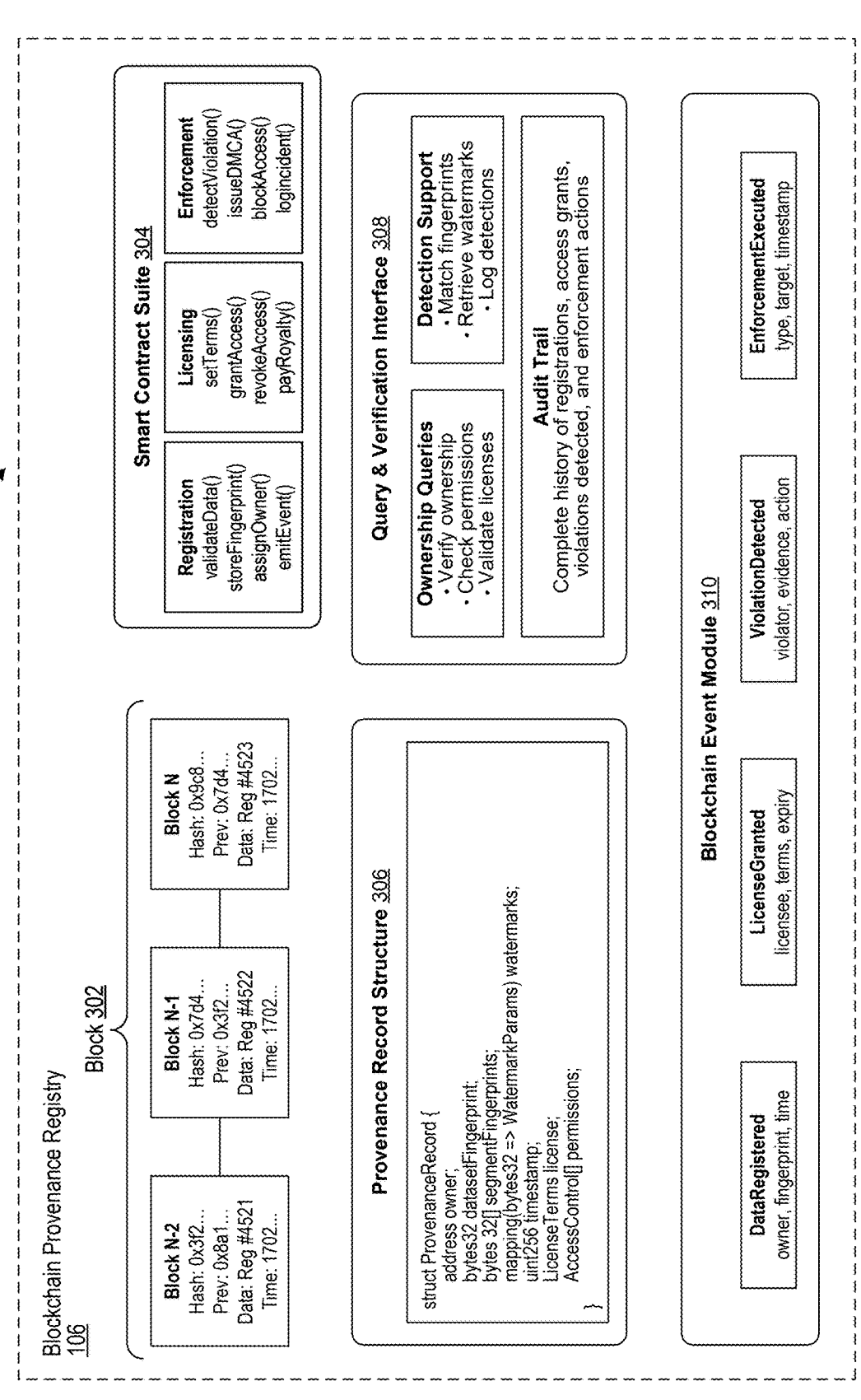
FIG. 3 shows a schematic illustrating an example environment of a blockchain provenance registry within a data watermarking platform, in accordance with some implementations of the present technology.

FIG. 3 shows a schematic illustrating an example environment 300 of a blockchain provenance registry 106 within a data watermarking platform, in accordance with some implementations of the present technology. The environment 300 can be implemented using components of example computer system 1300 illustrated and described in more detail with reference to FIG. 13. Likewise, implementations of example environment 300 can include different and/or additional components or can be connected in different ways.

The blockchain provenance registry 106 provides immutable tracking for the watermarked data. For example, information pertaining to the provenance of the watermarked data can be stored as blocks 302 on a blockchain (or as a transaction/record on any distributed ledger, such as a federated ledger). Immutability is achieved by chaining data blocks using hash pointers, where each block 302 references the cryptographic hash of its predecessor, thereby generating an unalterable historical sequence. When a watermark is applied to data by the injection engine, metadata such as original dataset identifiers, watermark patterns, key derivations, and/or authorized user records are stored as payloads in block 302. Each block can be timestamped and digitally signed by a consensus group of distributed nodes to ensure that the recorded information cannot be altered or erased without invalidating the entire chain. In implementations supporting alternative architectures, similar records and transactions can reside on distributed ledgers or other federated databases.

In some implementations, the blockchain provenance registry 106 provides access to one or more computer-implemented workflows (e.g., smart contracts) stored within a smart contract suite 304, structured to perform one or more operations associated with the stored blocks 302. The smart contract suite 304 can be structured as a set of code modules within the blockchain infrastructure. The smart contracts execute functions such as registering new data fingerprints, updating watermark parameter maps, processing authorized data transfers, managing royalty payments, initiating enforcement actions (such as DMCA notices or forensic probes), and so forth. The blockchain provenance registry 106 executes each workflow transaction in response to one or more events being triggered (e.g., an unauthorized data transfer).

Data stored in the blocks 302 can be structured similarly to an example provenance record structure 306. The provenance record structure 306 refers to one or more itemized fields mapped to a particular data type. The provenance record structure 306 can include one or more registration numbers, watermark pattern hashes, associated owner digital certificates, timestamped cryptographic proofs, hierarchical fingerprint data, and so forth, derived from the input content. Each field can be encoded using standardized formats (e.g., JSON) and can include references to external data classification systems or linked registries.

The blockchain provenance registry 106 can communicate with one or more users (e.g., individuals, other applications, other models, other automated systems) of the data watermarking platform using a query and verification interface 308. The query and verification interface 308 is structured to include one or more API endpoints and permission-controlled data access layers. Users are enabled to submit queries to extract provenance metadata, verify watermark presence, and/or confirm chain-of-custody records. The query and verification interface 308 returns proof objects, digital certificates, and/or other verification tokens generated from the blockchain's record structure.

A blockchain event module 310 can be used to track one or more events that occur to the watermarked data. The blockchain event module 310 can program event hooks and transaction monitors directly into the blockchain protocol layer to capture state changes such as new registrations, ownership transfers, watermark updates, enforcement actions, verification requests, and so forth. Each event can be logged as a structured transaction in the blockchain, linked to relevant block hashes and time stamps, and/or associated with smart contract workflow executions.

Figure 4:
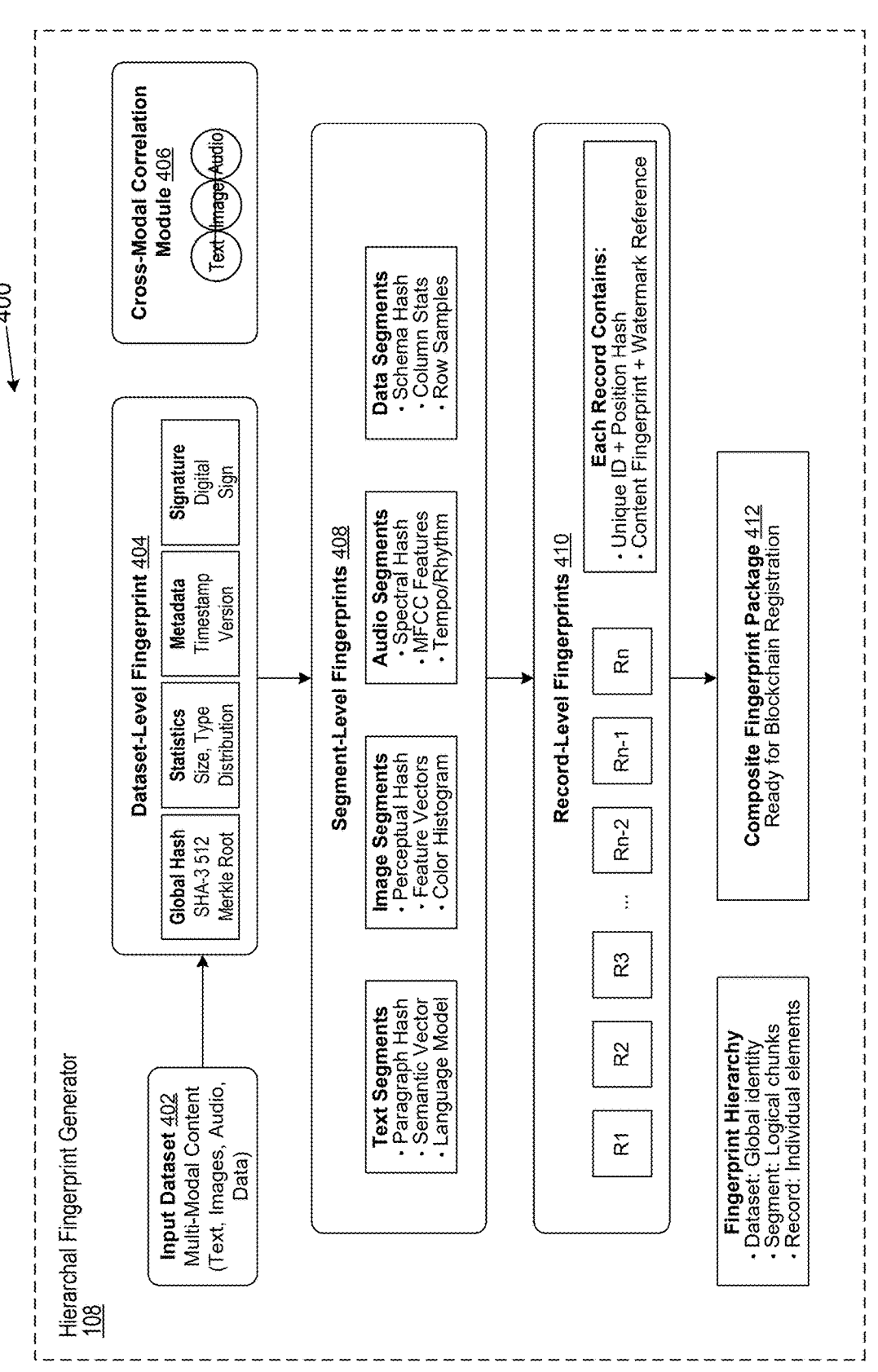
FIG. 4 shows a schematic illustrating an example environment of a hierarchical fingerprint generator within a data watermarking platform, in accordance with some implementations of the present technology.

FIG. 4 shows a schematic illustrating an example environment 400 of a hierarchical fingerprint generator 108 within a data watermarking platform, in accordance with some implementations of the present technology. The environment 400 can be implemented using components of example computer system 1300 illustrated and described in more detail with reference to FIG. 13. Likewise, implementations of example environment 400 can include different and/or additional components or can be connected in different ways.

The hierarchical fingerprint generator 108 can generate multiple levels of fingerprints to track different scopes of the same input dataset 402. The hierarchical fingerprint generator 108 can generate, for example, a dataset-level fingerprint 404 that represents a high-level signature capturing characteristics/features of the overall input dataset 402. To generate the dataset-level fingerprint 404, data (e.g., raw data, normalized data) from the input dataset 402 is processed by cryptographic hash functions (e.g., SHA-256) to generate a fixed-length bitstring.

The hierarchical fingerprint generator 108 can generate a segment-level fingerprint 408 that represents a medium-grain identifier for particular sections of the input dataset 402. The sections can be logically segmented (e.g., by topic, paragraph, sentence) or by size (e.g., by character size, document size). To generate the segment-level fingerprint 408, the hierarchical fingerprint generator 108 divides the input dataset 402 into logical sections according to predefined segmentation operations specific to each data modality. For textual data, segment boundaries can be determined by topic classification, paragraph division, and/or sentence boundaries. For multimedia, segments can be distinguished by scene, time window, and/or content block. Each segment can be independently tokenized and input into feature extraction operations (e.g., semantic hashing for text, region of interest detection for images, or spectral feature mapping for audio). The extracted segment-level features can be input into a cryptographic hash operation to generate unique segment-level fingerprints 408 that identify each internal data region. Segment-level fingerprints 408 can be cross-linked to the dataset-level fingerprint 404 via positional references to enable the data watermarking platform to trace partial content or sampled sections back to the larger dataset context.

The hierarchical fingerprint generator 108 can generate a record-level fingerprint 410 that represents fine-grained markers for individual portions of the data (e.g., individual entries, records). The hierarchical fingerprint generator 108 computes record-level fingerprints 410 by isolating and hashing individual data entries or atomic records within the input dataset 402. Each record, whether a database row, image frame, word, or timestamped event, can be uniquely defined by its raw content and associated metadata. The record-level fingerprint 410 is generated by running a deterministic hash function (such as SHA-3) over an ordered concatenation of the record's raw bytes, its positional index or primary key, and/or metadata (e.g., author, timestamp, modality flags). The record-level fingerprint 410 can be cross-linked to the dataset-level fingerprint 404 and/or the segment-level fingerprint 408 via positional references to enable the data watermarking platform to trace partial content or sampled sections back to the larger dataset context.

The hierarchical fingerprint generator 108 can combine or otherwise synthesize the multiple levels of fingerprints to generate a composite fingerprint package 412. The composite fingerprint package 412 can represent a unified signature for multi-modal content. The composite fingerprint package 412 can include the dataset-level fingerprint 404, segment-level 408, and/or record-level fingerprint 410. The composite fingerprint package 412 can be assembled using a Merkle tree or similar data structure, with each leaf node representing a record-level fingerprint 410 and intermediate nodes aggregating segment-level fingerprints 408 and anchored by the dataset-level fingerprint 404 at the root. The composite package can indicate references and dependencies among all fingerprints.

For data with multiple modalities (e.g., image/video/audio/text combinations), a cross-modal correlation module 406 can associate fingerprints derived from disparate data modalities present in the composite fingerprint package 412. For example, the cross-modal correlation module 406 can include one or more submodules that ingest segment-level fingerprints generated from text, image, audio, and/or structured data domains. Each submodule outputs signature vectors, which can be used to quantify statistical and semantic relationships across fingerprint types to generate a set of cross-modal correlation scores and composite hashes. The outputs represent data instances that structurally and conceptually interlink modalities, such as aligning a photograph's perceptual hash with descriptive language-model embeddings extracted from accompanying text. In some embodiments, the cross-modal correlation module 406 operates on fused feature representations using deep neural networks or graph convolution architectures.

Figure 5:
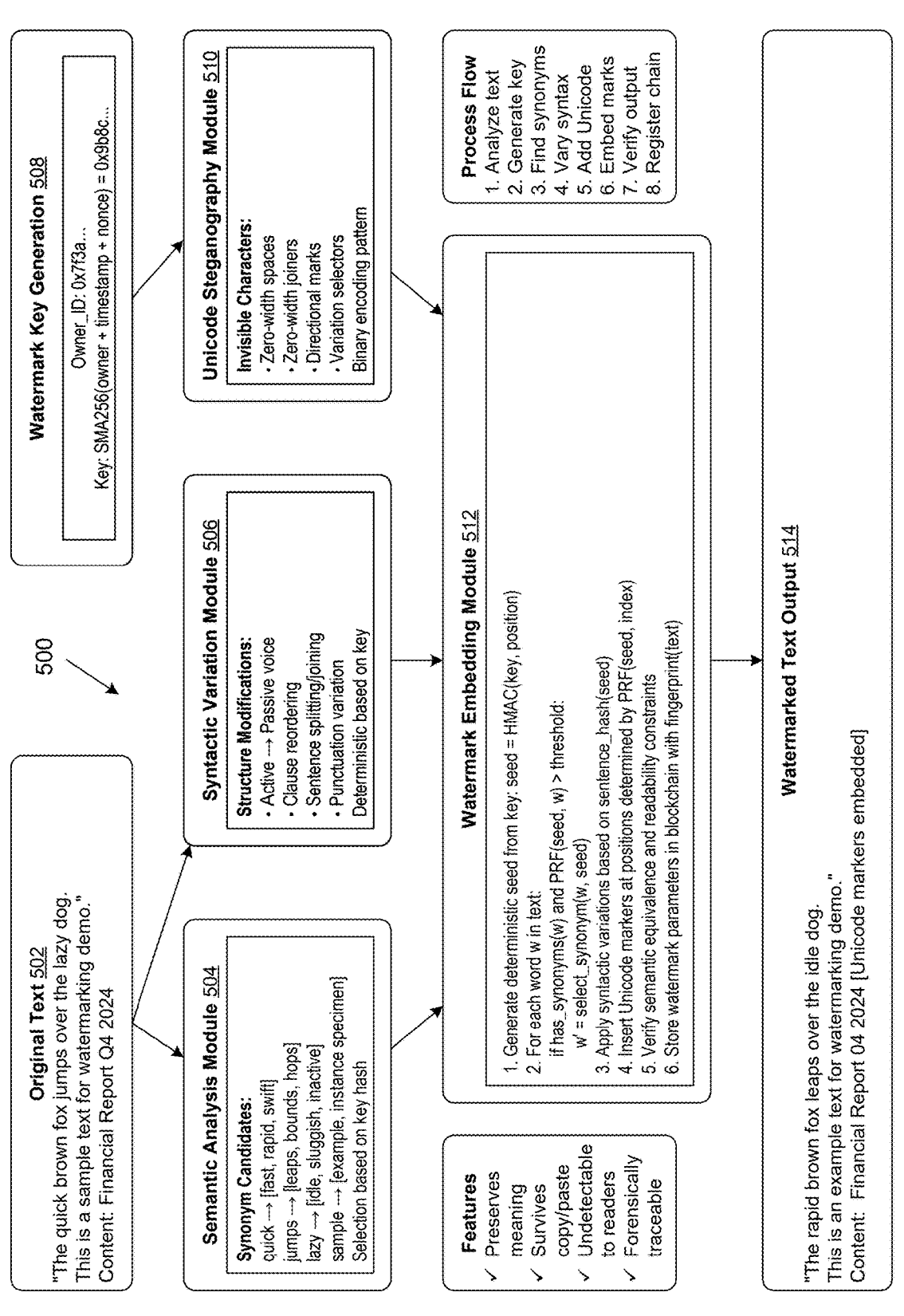
FIG. 5 shows a schematic illustrating an example environment of watermarking text data using a data watermarking platform, in accordance with some implementations of the present technology.

FIG. 5 shows a schematic illustrating an example environment 500 of watermarking text data using a data watermarking platform, in accordance with some implementations of the present technology. The environment 500 can be implemented using components of example computer system 1300 illustrated and described in more detail with reference to FIG. 13. Likewise, implementations of example environment 500 can include different and/or additional components or can be connected in different ways.

Original text 502 can be evaluated/analyzed by inputting the original text 502 (such as "The quick brown fox jumps over the lazy dog" in FIG. 5) into a semantic analysis module 504 and/or a syntactic variation module 506. The semantic analysis module 504 can generate one or more synonyms of portions of the original text 502 (e.g., words). The syntactic variation module 506 is enabled to identify semantic units within original text 502, such as specific words, phrases, or named entities, and generate synonyms or semantic variants for those units.

The data watermarking platform can use a synonym model (e.g., an agent, an AI model) trained on linguistic datasets including monolingual text corpora, such as books, articles, and public web pages, to identify word usage and contextual relationships. During training, neural network architectures (e.g., transformer-based models such as BERT or GPT) are enabled to produce context-sensitive embedding vectors for input terms by mapping words and phrases to a high-dimensional semantic space with proximity reflecting similarity of meaning. When tasked with generating synonyms, the trained synonym model processes the input text to derive its contextual embeddings, queries a database or learned space for candidate synonyms, and generates a score (e.g., a similarity score) indicating how close other words are to the embedding in the high-dimensional semantic space (i.e., the closer the words are, the more likely the words are synonyms).

The syntactic variation module 506 can apply one or more deterministic modifications to the structural syntax of the text under control of a cryptographically derived watermark key. For example, modifications include switching between active and passive voice, altering clause order within composite sentences, joining or dividing sentences, and varying non-semantic punctuation structures. The selection and application of specific syntactic operations are defined by the watermark key.

The data watermarking platform can generate a watermark key using a watermark key generation module 508. The watermark key can be used by a Unicode steganography module 510 to encode invisible watermark signals into the text by algorithmically placing non-printing or zero-width Unicode characters (such as U+200B ZERO WIDTH SPACE or U+2060 WORD JOINER) at positions determined by the key's pseudo-random output. Patterns of the characters are predictable and verifiable by the data watermarking platform but remain undetectable to human readers or conventional text editors.

The watermark can be embedded into the original text 502 using a watermark embedding module 512. The watermark embedding module 512 generates a watermarked text output 514. The watermark embedding module 512 applies the semantic substitutions and syntactic transformations in the order defined by the watermark key and dependency graph, then overlays the steganographic Unicode marks as per the module's predetermined encoding pattern. Output can be generated in the form of watermarked text output 514, which retains the same semantic narrative and grammatical readability as the original text 502 but contains embedded, transformation-resistant watermark signals across the modalities.

Figure 6:
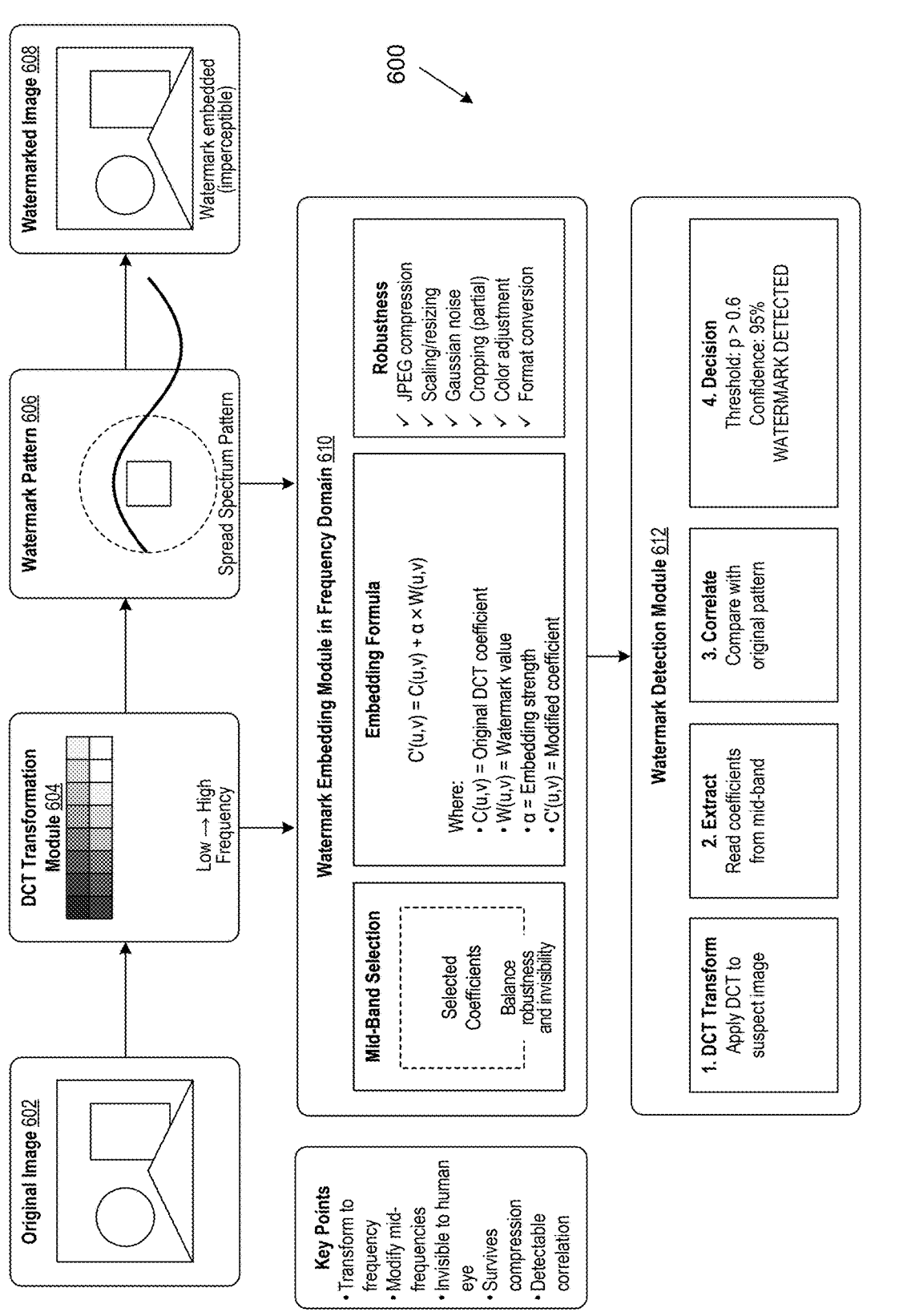
FIG. 6 shows a schematic illustrating an example environment of watermarking media using a data watermarking platform, in accordance with some implementations of the present technology.

FIG. 6 shows a schematic illustrating an example environment 600 of watermarking media using a data watermarking platform, in accordance with some implementations of the present technology. The environment 600 can be implemented using components of example computer system 1300 illustrated and described in more detail with reference to FIG. 13. Likewise, implementations of example environment 600 can include different and/or additional components or can be connected in different ways.

The data watermarking platform transforms an original image 602 into a frequency representation using the DCT transformation module 604. The DCT transformation module 604 divides the original image into discrete blocks (e.g., of size 8×8 pixels) and for each block determines the DCT by producing arrays of coefficients that represent the contribution of sinusoidal basis functions at varying frequencies. Low-frequency coefficients encode averaged color and intensity, mid-frequency coefficients encode edge and texture details, and high-frequency coefficients encode subtle or noise-like informational content. The output is a mapped frequency representation.

The frequency representation can be used to generate a watermark pattern 606. The watermark pattern can be determined using one or more of cryptographically derived randomization, deterministic bit-encoding schemes, and so forth. The watermark pattern 606 can encode information, such as ownership, provenance, or an authentication fingerprint, and can be structured to primarily manipulate mid-frequency DCT coefficients. The watermark pattern 606 can be embedded into the original image 602 using a watermark embedding module 610 in a frequency domain. The watermark embedding module 610 selects the specific DCT coefficients and modifies them according to the encoding scheme prescribed by the watermark pattern (such as quantizing selected mid-band coefficients to distinct values correlated with watermark bits, applying constrained coefficient shifts, or superimposing orthogonal base vectors representing encoded data). The modification can be implemented in the frequency domain. An inverse-DCT operation can be applied to the modified frequency representation to reconstruct a spatial domain image that perceptually matches the original 602 but includes the encoded watermark signal. Embedding the watermark pattern 606 into the original image 602 results in a watermarked image 608.

To flag suspicious content, a watermark detection module 612 can apply a DCT transform to a suspect image, read coefficients from mid-band, compare the coefficients with the original pattern, and determine whether or not a watermark is present. The watermark detection module 612 can apply the DCT transform to the suspect image (i.e., segmenting the image into blocks and calculating DCT coefficients as performed in the watermarking operation). The watermark detection module 612 can read specific (e.g., mid-band) coefficients and compare the extracted values against the original watermark pattern using one or more statistical matching or correlation scoring operations to determine a degree of reproducibility and pattern stability of watermark bits in manipulated or distributed images. If the coefficients align with a registered watermark pattern within statistical thresholds of significance, the watermark detection module 612 flags the content as watermarked and further logs the detection event for provenance attribution, registration verification, or automated enforcement routines.

Figure 7:
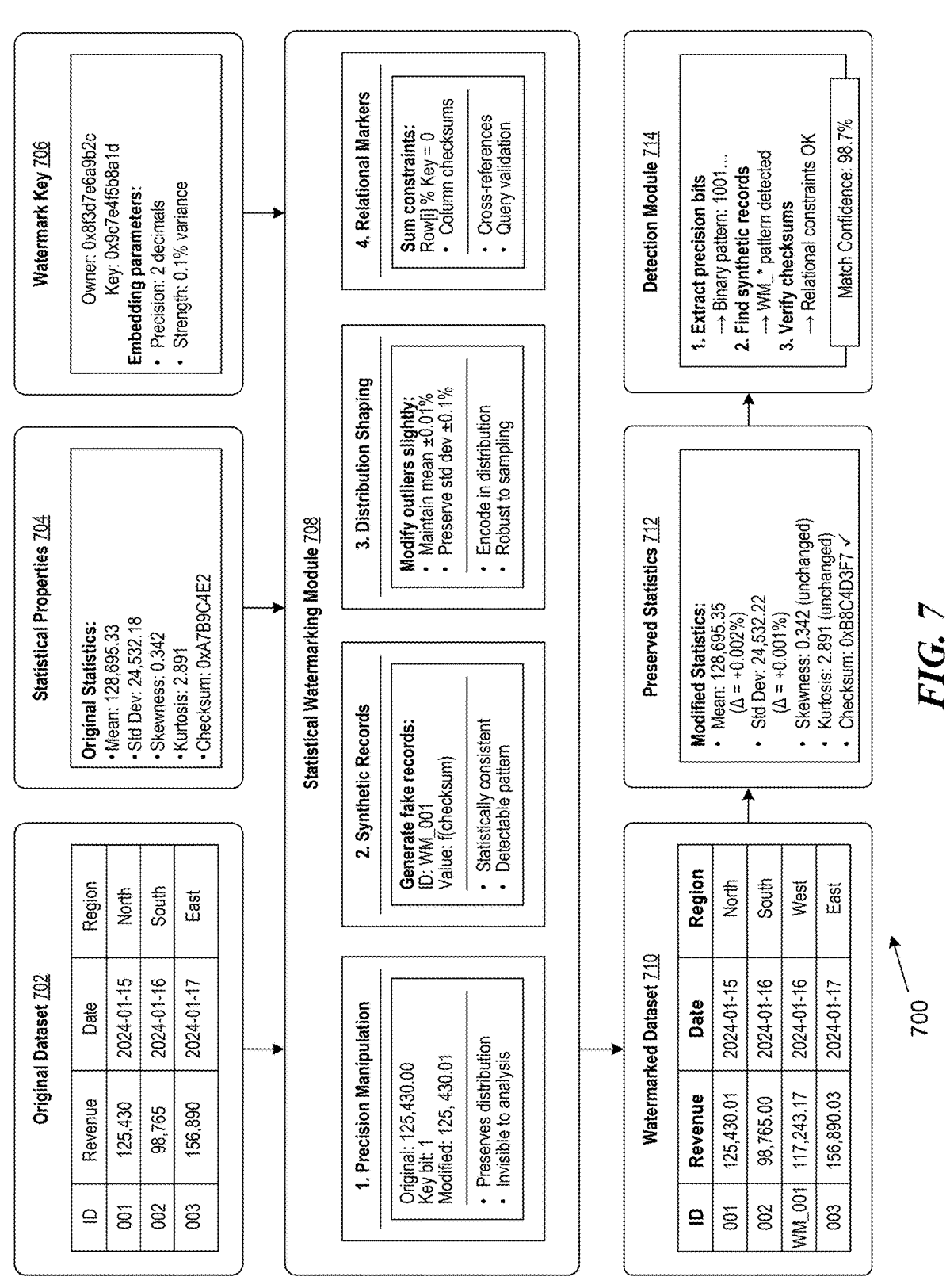
FIG. 7 shows a schematic illustrating an example environment of watermarking structured data using a data watermarking platform, in accordance with some implementations of the present technology.

FIG. 7 shows a schematic illustrating an example environment 700 of watermarking structured data using a data watermarking platform, in accordance with some implementations of the present technology. The environment 700 can be implemented using components of example computer system 1300 illustrated and described in more detail with reference to FIG. 13. Likewise, implementations of example environment 700 can include different and/or additional components or can be connected in different ways.

An original dataset 702, statistical properties of the original dataset 704, and/or a watermark key 706 can be input into a statistical watermarking module 708 that is structured to generate a watermarked dataset 710. The original dataset 702 represents structured tabular information (e.g., rows and columns). The statistical watermarking module 708 operates on the inputs by determining, then storing, metadata such as column-wise means, standard deviations, kurtosis values, checksums, and/or distribution histograms for the original dataset 702. Using the watermark key 706, the statistical watermarking module 708 generates a deterministic sequence specifying locations and magnitudes for data modifications. The data watermarking platform, for example, encodes watermark bits by introducing shifts to select decimal places in numeric fields or modulating the least significant digits of value entries such that the global metrics (e.g., mean, variance, and distribution shape) remain statistically unchanged.

The data watermarking platform can determine preserved statistics 712 to ensure that the statistical metric values from the original dataset 702 are maintained. As each bit of watermark data is embedded, the data watermarking platform can re-determine the target statistical metrics and verify that the altered dataset conforms to constraints set by the original dataset 702 (e.g., checking a per-column mean, global standard deviation, skewness, kurtosis, and custom checksums as captured during the initial evaluation).

A detection module 714 can be used to flag suspicious content. The detection module 714 can ingest a candidate dataset and extract watermarked regions and/or baseline statistics. The detection module 714 can use the watermark key (provided directly or determined via owner identity lookup) to identify and extract encoded watermark bits. A statistical comparison can be performed between extracted metrics and registry values. When the data watermarking platform identifies encoded values that match registry entries beyond preset confidence thresholds, the data watermarking platform can flag suspect datasets for enforcement or attribution processes.

Figure 8:
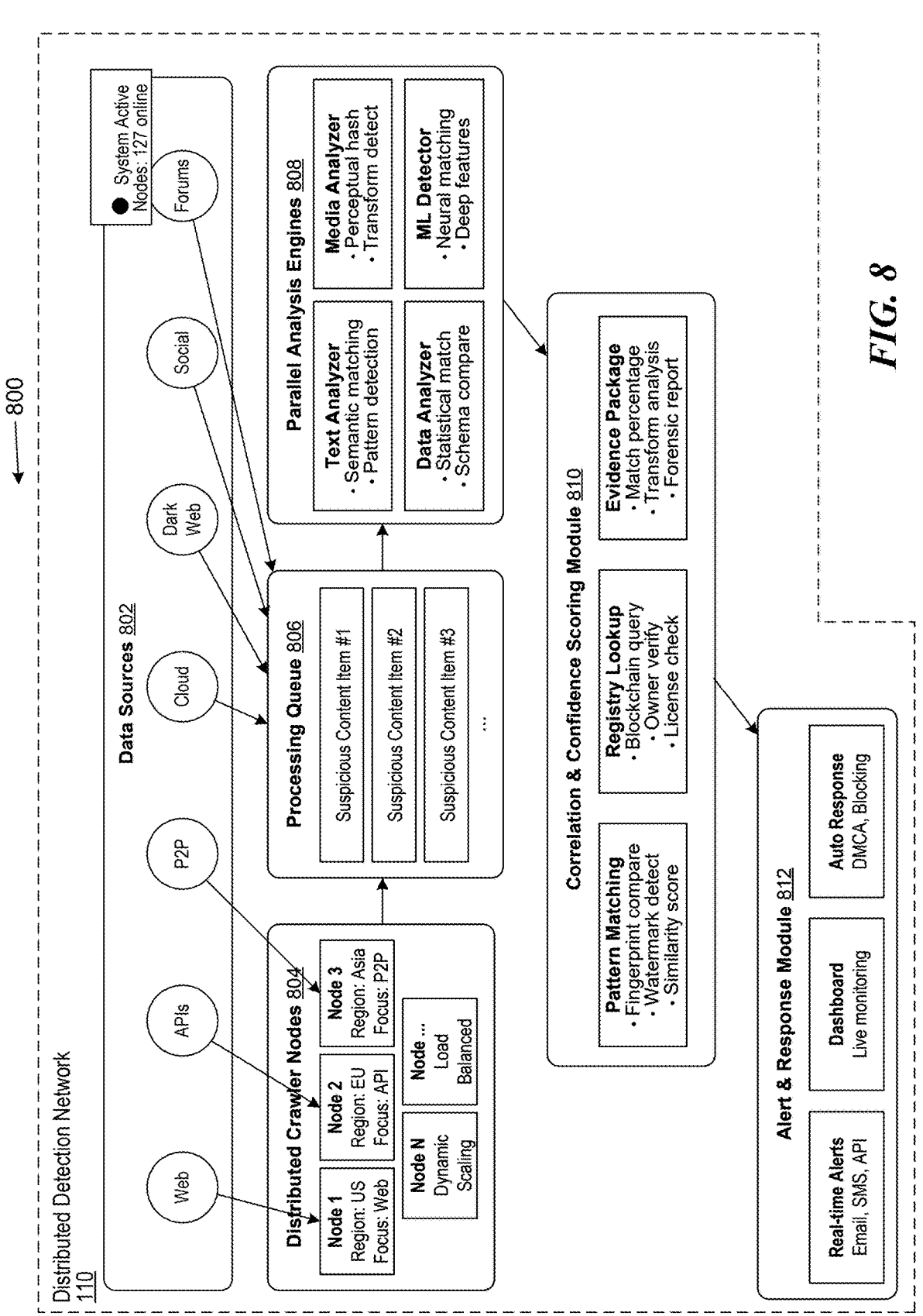
FIG. 8 shows a schematic illustrating an example environment of a distributed detection network used by a data watermarking platform to detect data distribution, in accordance with some implementations of the present technology.

FIG. 8 shows a schematic illustrating an example environment 800 of a distributed detection network 110 within a data watermarking platform, in accordance with some implementations of the present technology. The environment 800 can be implemented using components of example computer system 1300 illustrated and described in more detail with reference to FIG. 13. Likewise, implementations of example environment 800 can include different and/or additional components or can be connected in different ways.

The distributed detection network 110 can operate at an internet-scale. For example, the distributed detection network 110 can access data sources 802 that include, for example, particular websites, application programming interfaces, and so forth. Distributed crawler nodes 804 can continuously scrape or otherwise monitor the accessed data sources 802. The distributed crawler nodes 804 can execute continuous data acquisition cycles and, in some implementations, be modal-specific (e.g., where individual nodes focus on distinct content types such as text, image, audio, or structured data).

Suspicious content (e.g., content that satisfies a particular similarity threshold or constraint, or any input data to be evaluated such as watermarked data) can be ranked in a processing queue 806. The queue can rank suspicious items using deterministic metrics, such as timestamp order, measured degree of similarity to watermarked references, detected anomaly levels in content structure, or contextual metadata tags. For example, the rank can be based on a temporal timestamp or a degree of importance associated with the suspicious content (e.g., content with higher degrees of similarity is ranked higher). Content with higher similarity scores, stronger structural matches, or more recent discovery timestamps can be assigned to elevated priority within the queue. The processing queue can be managed using data structures such as a priority heap data structure (i.e., tasks with a higher rank can be processed first).

Parallel analysis engine(s) 808 are enabled to evaluate the suspicious content identified in the processing queue 806 to generate a set of measurements for different metrics of the suspicious content and the original watermarked data. The parallel analysis engine(s) 808 perform an array of programmatically defined determinations (e.g., measurements), such as those associated with exact and/or approximate fingerprint matching, metadata cross-validation, signal pattern extraction in multimedia content, and/or semantic similarity computation for textual data. A correlation and confidence scoring module 810 is enabled to use the measurements generated by the parallel analysis engine(s) 808 to compare the suspicious content and the original watermarked data. For example, the correlation and confidence scoring module 810 uses statistical correlation algorithms, threshold-based classifiers, and/or probabilistic inference models to determine a degree of match and/or likelihood of misappropriation. Each comparison event results in a confidence score and/or correlation matrices that specify which features and fingerprints most align between candidate and reference datasets. In some implementations, the module aggregates results from multiple analysis engines using ensemble classifiers or weighted majority voting schemes.

For example, the correlation and confidence scoring module 810 generates a unique digital signature (or hash) for a piece of content (e.g., a digital asset) and compares the hash to the signature of the original watermarked data. Identical hashes between the digital signatures can indicate no changes (i.e., a direct copy), whereas near-identical hashes between the digital signatures can indicate minor differences (i.e., altered or slightly modified copies). Comparing the digital signatures enables the correlation and confidence scoring module 810 to identify unauthorized duplication or tampering in digital assets. In some implementations, the correlation and confidence scoring module 810 identifies embedded information such as timestamps, author names, file origins, and/or access logs within the suspicious content. By comparing the metadata fields to those of the original data, the correlation and confidence scoring module 810 can detect inconsistencies or anomalies that can indicate unauthorized access, manipulation, or forgery. Additionally or alternatively, the correlation and confidence scoring module 810 evaluates the underlying data patterns in multimedia files, such as audio, images, or video. The correlation and confidence scoring module 810 extracts features such as frequency spectra, pixel arrangements, or watermark signals to identify deviations from expected patterns or the presence of modifications. Moreover, the correlation and confidence scoring module 810, in some implementations, uses natural language processing to compare the meaning and context of textual content with the original, watermarked data. By evaluating a degree to which the texts align in terms of semantics (e.g., a distance between vector representations of the texts), the correlation and confidence scoring module 810 can identify misappropriation such as paraphrasing, plagiarism, or unauthorized reuse, even if the wording has been changed.

An alert and response module 812 can be used to generate real-time alerts, automatic notifications, and/or other computer-implemented operations in response to the comparisons performed by the correlation and confidence scoring module 810. The alert and response module 812 generates near-real-time or real-time alerts that include structured notifications. The alerts can be transmitted via messaging protocols and recorded via timestamped event logs.

Figure 9:
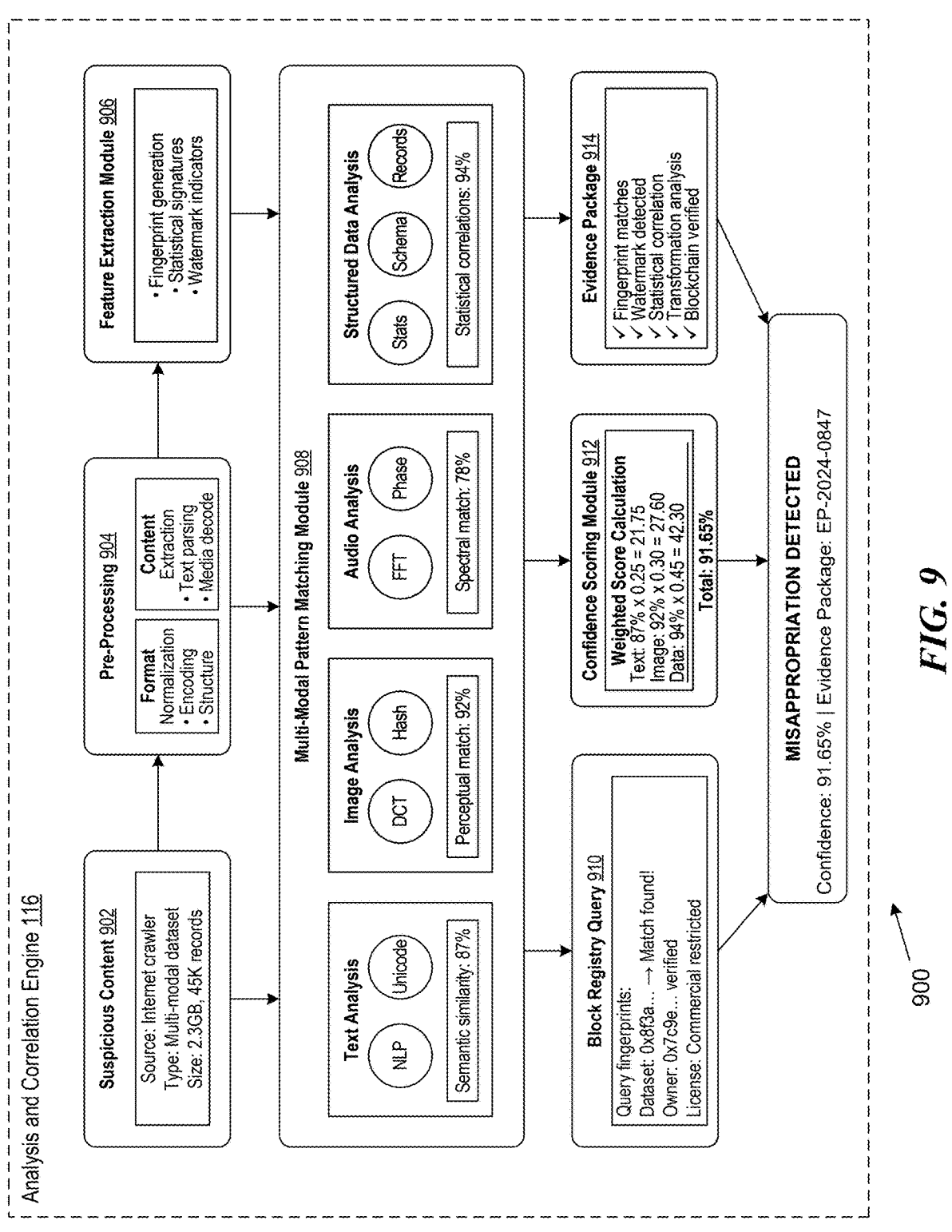
FIG. 9 shows a schematic illustrating an example environment of an analysis and correlation engine used by a data watermarking platform to identify misappropriated data, in accordance with some implementations of the present technology.

FIG. 9 shows a schematic illustrating an example environment 900 of an analysis and correlation engine within a data watermarking platform, in accordance with some implementations of the present technology. The environment 900 can be implemented using components of example computer system 1300 illustrated and described in more detail with reference to FIG. 13. Likewise, implementations of example environment 900 can include different and/or additional components or can be connected in different ways.

The analysis and correlation engine 116 evaluates flagged suspicious content 902 (e.g., those flagged using methods discussed with reference to FIGS. 5-7). For example, the analysis and correlation engine 116 can pre-process the suspicious content 902 by pre-processing the suspicious content 902 to generate preprocessed (e.g., normalized, encoded) content 904. Upon ingestion, all suspicious content can be routed through an initial pre-processing pipeline within the analysis and correlation engine 116 to normalize data formats, decode content from compression or encryption, strip metadata, encode data in a canonical internal representation, and so forth. For example, videos are decoded into image frames.

The analysis and correlation engine 116 can identify indicators of the watermark (i.e., extracted features 906) embedded in the suspicious content 902. Modality-specific extraction routines (such as text segmentation and semantic parsing for text, DCT and spread-spectrum pattern recognition for images, psychoacoustic analysis for audio, and statistical attribute analysis for tabular data) are executed in parallel or sequence as defined by the canonical content type. Extracted features 906 refer to structural watermark fingerprints, frequency or statistical perturbation signatures, cryptographically derived bit sequences, and so forth.

A multi-modal pattern matching module 908 can be used to correlate watermarks across data types based on the suspicious content 902, the preprocessed content 904, and the extracted features 906. The multi-modal pattern matching module 908 can compare dimensional and statistical representations of extracted features against a registry of known watermark patterns using methods discussed in further detail in FIGS. 5-7. For registration verification and provenance tracking, a blockchain registry query 910 can query a blockchain or other distributed database using information derived from the multi-modal pattern matching module and/or the extracted features 906. The blockchain registry query 910 refers to structured queries to a blockchain or other cryptographically secure distributed database containing registry events, provenance hashes, and/or ownership attestations for watermarked content. The blockchain registry query 910 can be used to identify evidence confirming original ownership, registration time, associated licenses, and/or metadata.

The analysis and correlation engine 116 can generate a confidence score 912 for the suspicious content 902 based on output from the multi-modal pattern matching module 908. The score calculation can indicate a degree of a match (e.g., percentage, fraction, decimal) between extracted features and registered patterns. Further methods of generating the confidence score 912 are discussed with reference to the correlation and confidence scoring module 810 in FIG. 8. In some implementations, the data watermarking engine dynamically assigns confidence weightings based on content type (for example, text signals may be weighted less than statistically matched datasets, and image watermarks more than audio watermark fragments). The resulting confidence score establishes an objective metric for content provenance and suspected misuse. The analysis and correlation engine 116 can generate an evidence package 914 based on output from the multi-modal pattern matching module 908. The evidence package 914 can include quantifiable data such as feature arrays, confidence calculations, registry matches, timestamp attestations, owner and license records, and/or original content hashes.

FIG. 10 shows a schematic illustrating an example environment 1000 of a feedback loop implemented within a data watermarking platform, in accordance with some implementations of the present technology. The environment 1000 can be implemented using components of example computer system 1300 illustrated and described in more detail with reference to FIG. 13. Likewise, implementations of example environment 1000 can include different and/or additional components or can be connected in different ways.

An attack detection engine 1002 can implement one or more operations described with reference to FIGS. 5-7 to identify suspicious content. The attack detection engine 1002 runs continuous monitoring routines that reference the detection operations detailed in FIGS. 5-7.

An attack analysis engine 1004 can be used to identify patterns in, for example, attack vectors, weakness patterns, success rates of attacks, and/or temporal trends. The attack analysis engine 1004 compares incoming attack vectors across historical logs to detect similarity clusters and signature combinations that identify which components or algorithms of the watermarking system are most susceptible. The recurring patterns can be catalogued and used to prioritize system redesign or protective measures against particular transformation or manipulation methods. In addition to identifying structural weaknesses, the attack analysis engine 1004 can track success rates of attacks. For each documented attack method, the attack analysis engine 1004 can generate a success metric by quantifying the frequency and effectiveness (e.g., measured by a number of unauthorized data accesses) of watermark removals or other attack operations.

The attack analysis engine 1004 can use one or more machine learning models to, for example, cluster the attacks, predict future attacks, generate risk assessments, and so forth. Unsupervised learning models, such as k-means clustering or hierarchical agglomerative clustering, can be used to group attacks sharing common features and identify latent structures within the data. Supervised models, including tree-based classifiers and neural networks, can be used to predict future attack patterns. These machine learning routines run iteratively by updating model parameters as new data arrives.

A strategy generator 1006 is enabled to generate one or more actions or responses to modify the watermarked data (e.g., modify the watermark pattern). The strategy generator 1006 evaluates the risk profile, selects or adapts watermark patterns (such as changing domain embedding strength, shuffling coefficients, introducing multi-level redundancy, or rotating cryptographic keys), and, in some implementations, executes cross-modality adjustments (e.g., synchronizing visual and textual watermark patterns for multi-modal content).

The attack detection engine 1002, the attack analysis engine 1004, and the strategy generator 1006 form an adaptive evolution feedback loop 1008 where the strategies (e.g., actions/responses) generated by the strategy generator 1006 can be iteratively adjusted. Output strategies from the generator can be deployed in live or simulated watermarking workflows and monitored by the attack detection engine 1002 for post-implementation attack responses. The adaptive evolution feedback loop 1008 can use one or more evolution metrics 1010 (which can include measurement of watermark extraction fidelity, attack repetition frequency, model prediction accuracy, and/or system responsiveness), strategy database(s) 1012 (which can include historical countermeasure actions, analytic outcomes, attack vectors, and/or their success/failure statistics), and/or real-time update(s) 1014 to supplement the iterative adjustments to the strategies.

FIG. 11 is a flow diagram illustrating an example process 1100 of embedding and storing a traceable watermark in multi-modal digital data using a data watermarking platform, in accordance with some implementations of the present technology. In some implementations, the process 1100 is performed by a computer system—e.g., example computer system 1300 illustrated and described in more detail with reference to FIG. 13. Implementations can include different and/or additional operations or can perform the operations in different orders.

In operation 1102, the data watermarking platform can obtain, access, and/or receive an input dataset represented by at least one data modality that includes text data (e.g., a sequence of alphanumeric characters), image data (e.g., an array of pixel intensity values), audio data (e.g., a sampled digital waveform), video data (e.g., temporally ordered image frames), and/or structured data (e.g., records organized in rows and columns). For text data, the data watermarking platform can initialize listeners and/or parsers that ingest files in formats such as TXT, CSV, DOCX, and PDF through direct uploads, API endpoints, and/or connections to data lakes and document management systems. For image data, the data watermarking platform can receive raster (e.g., JPEG, PNG, BMP) or vector (e.g., SVG) files from user uploads, batch ingestion jobs, and/or URLs. For audio data, the data watermarking platform can use file upload interfaces to receive files in formats such as WAV, MP3, and/or FLAC. For video data, the data watermarking platform can receive MP4, AVI, MOV, and/or MKV files from uploads and/or real-time streams. Structured data can be received through connections to relational databases (e.g., SQL), data warehouses, spreadsheet files (CSV, XLSX), and/or via API calls.

In operation 1104, the data watermarking platform can generate and/or determine, for each data modality, a watermark pattern that includes one or more parameters produced by applying a cryptographic hash function to a unique dataset identifier identifying the input dataset. The one or more parameters provide instructions to watermark the input dataset. For example, the data watermarking platform extracts or computes a globally unique identifier for the input dataset, such as a fingerprint, canonical hash code, or registry index, and concatenates the unique identifier with system credentials or owner-specific information, such as a private key or nonce. The resulting value can operate as the seed for a cryptographic hash function (SHA-256, HMAC, or SHA-3) to produce a fixed-length output that is deterministic and collision-resistant. Each data modality (text, image, audio, video, or structured data) can use this hash output as the source for one or more watermark parameters.

In operation 1106, the data watermarking platform can embed each watermark pattern in the input dataset to generate a watermarked dataset by modifying a discrete data value, a data relationship, and/or an arrangement of data elements within the input dataset at a location determined in accordance with the one or more parameters. For example, the data watermarking platform uses a set of indices and/or embedding instructions derived in operation 1104 to identify where in the data, in terms of words, pixel blocks, samples, frames, schema fields, or relational links, the watermark should reside. For text data, the data watermarking platform can substitute words with context-appropriate synonyms, insert invisible Unicode characters at positions specified by the hash, and/or apply syntactic transformations such as clause reordering (as further discussed with reference to FIG. 5). In some implementations, where the at least one data modality includes the text data, the data watermarking platform can embed a respective watermark pattern by, for example, replacing predetermined words within the text data with synonyms selected based on the one or more parameters, modifying a sentence structure of the text data in accordance with one or more transformation rules defined by the one or more parameters, and/or inserting one or more Unicode characters in the text data at one or more positions determined by the one or more parameters.

For images, the data watermarking platform can access the pixel intensity array or DCT frequency coefficients and modify mid-band coefficients in designated blocks, as determined by the parameter seed (as further discussed with reference to FIG. 6). For video, the data watermarking platform can modify pixel or color channel values in particular frames, adjust frame relationships, and so forth. In some implementations, where the at least one data modality includes the image data or the video data, the data watermarking platform can embed a respective watermark pattern by, for example, modifying one or more of a discrete cosine transform coefficient or a wavelet coefficient of the image data or video data based on the one or more parameters, adding a frame-sequence signature in video data in accordance with a timing pattern defined by the one or more parameters, and/or generating a hash-based identifier from the image data or video data in accordance with the one or more parameters.

In audio, the data watermarking platform can shift selected frequency bands or sample amplitudes below psychoacoustic detection limits using phase encoding or masking. In some implementations, where the at least one data modality includes the audio data, the data watermarking platform can embed a respective watermark pattern by, for example, masking a watermark signal at a particular frequency determined by the one or more parameters, modifying a phase relationship between frequency components within the audio data in accordance with a phase shift value defined by the one or more parameters, and so forth.

With structured data, the data watermarking platform can deterministically alter cell values or column aggregates while maintaining global statistical properties (as further discussed with reference to FIG. 7). In some implementations, where the at least one data modality includes the structured data, the data watermarking platform can embed a respective watermark pattern by, for example, modifying a numerical value within the structured data in accordance with a statistical distribution defined by the one or more parameters, inserting one or more generated data records in the structured data at a position determined by the one or more parameters, and the like.

In operation 1108, the data watermarking platform can generate a hierarchical fingerprint for the watermarked dataset by generating a series of cryptographic hash identifiers over multiple portions of the watermarked dataset. Each cryptographic hash identifier can be generated by applying a particular cryptographic hash function to corresponding portions of the watermarked dataset. The data watermarking platform can correlate watermarks across the at least one data modality by identifying one or more associations between a respective watermark pattern embedded in the at least one data modality of the input dataset (e.g., the correlation between a descriptive sentence embedded with a text watermark and a visually watermarked image that depicts the described scene).

The hierarchical fingerprint can include one or more higher-level hash identifiers that each represent a first portion of the watermarked dataset and one or more lower-level hash identifiers that each represent a second portion of the watermarked dataset smaller than the first portion. The hierarchical fingerprint includes, for example, a dataset-level fingerprint that represents the watermarked dataset, a segment-level fingerprint that represents a portion within each data modality of the watermarked dataset, and/or a record-level fingerprint that represents an individual data entry of the watermarked dataset. The hierarchical fingerprint can be generated by combining fingerprint data from multiple data modalities into a composite fingerprint structure.

In operation 1110, the data watermarking platform can store each watermark pattern and the hierarchical fingerprint in a distributed database (e.g., a distributed ledger, a blockchain, a federated ledger) accessible to one or more authorized computing devices participating in a decentralized network. In some implementations, the distributed ledger is a blockchain. The data watermarking platform can detect a correlation by comparing one or more observed watermark patterns against the generated watermark pattern and deploy one or more smart contracts on the blockchain that trigger one or more predetermined computer-executable workflows in response to detecting the correlation. In some implementations, the database is a federated ledger that includes multiple ledger nodes operated by different computing devices. Each ledger node can maintain a record of each watermark pattern and the hierarchical fingerprint. Each ledger node can be structured to cryptographically sign a consensus vote to add the record to the federated ledger.

The data watermarking platform can modify the one or more parameters used to generate watermark patterns based on one or more observed attack patterns determined using previously watermarked datasets. In some implementations, the data watermarking platform uses an artificial intelligence model (e.g., a general-purpose model such as a large language model, an agentic artificial intelligence model) to modify the one or more parameters based on observed attack patterns configured to remove one or more watermark patterns. Further examples and methods of using the artificial intelligence model are discussed with reference to FIG. 12.

In some implementations, the data watermarking platform can deploy one or more crawler nodes that scan one or more websites to identify observed watermarked content and apply one or more inverse transformations to the observed watermarked content. The one or more inverse transformations can be structured to generate the input dataset using the watermarked dataset. The data watermarking platform can match one or more observed watermark patterns against the generated watermark pattern by generating a similarity score between the one or more observed watermark patterns and the generated watermark pattern.

Example Implementation of the Models of the Data Watermarking Platform

Figure 12:
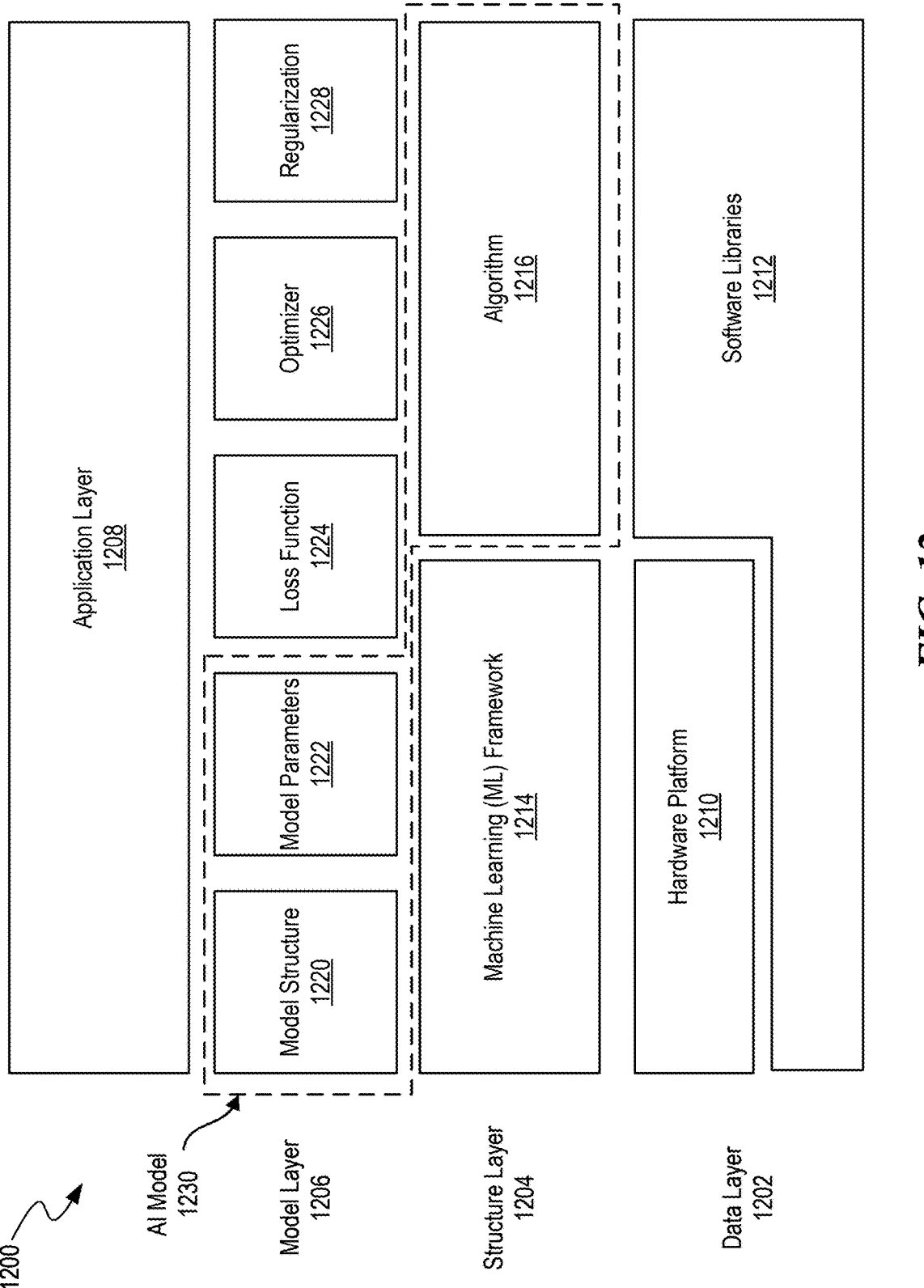
FIG. 12 illustrates a layered architecture of an AI system that can implement the machine learning models of a data watermarking platform, in accordance with some implementations of the present technology.

FIG. 12 illustrates a layered architecture of an AI system 1200 that can implement the ML models of the data watermarking platform of FIG. 1, in accordance with some implementations of the present technology. Example ML models can include the models executed by the data watermarking platform, such as those discussed with reference to FIG. 11. Accordingly, the models can include one or more components of the AI system 1200.

As shown, the AI system 1200 can include a set of layers, which conceptually organize elements within an example network topology for the AI system's architecture to implement a particular AI model. Generally, an AI model is a computer-executable program implemented by the AI system 1200 that analyses data to make predictions. Information can pass through each layer of the AI system 1200 to generate outputs for the AI model. The layers can include a data layer 1202, a structure layer 1204, a model layer 1206, and an application layer 1208. The algorithm 1216 of the structure layer 1204 and the model structure 1220 and model parameters 1222 of the model layer 1206 together form an example AI model. The optimizer 1226, loss function engine 1224, and regularization engine 1228 work to refine and optimize the AI model, and the data layer 1202 provides resources and support for application of the AI model by the application layer 1208.

The data layer 1202 acts as the foundation of the AI system 1200 by preparing data for the AI model. As shown, the data layer 1202 can include two sub-layers: a hardware platform 1210 and one or more software libraries 1212. The hardware platform 1210 can be designed to perform operations for the AI model and include computing resources for storage, memory, logic and networking, such as the resources described in relation to FIGS. 13 and 11. The hardware platform 1210 can process amounts of data using one or more servers. The servers can perform backend operations such as matrix calculations, parallel calculations, machine learning (ML) training, and the like. Examples of servers used by the hardware platform 1210 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1210 can include computing resources, (e.g., servers, memory, etc.) offered by a cloud services provider. The hardware platform 1210 can also include computer memory for storing data about the AI model, application of the AI model, and training data for the AI model. The computer memory can be a form of random-access memory (RAM), such as dynamic RAM, static RAM, and non-volatile RAM.

The software libraries 1212 can be thought of suites of data and programming code, including executables, used to control the computing resources of the hardware platform 1210. The programming code can include low-level primitives (e.g., fundamental language elements) that form the foundation of one or more low-level programming languages, such that servers of the hardware platform 1210 can use the low-level primitives to carry out specific operations. The low-level programming languages do not require much, if any, abstraction from a computing resource's instruction set architecture, enabling them to run quickly with a small memory footprint. Examples of software libraries 1212 that can be included in the AI system 1200 include INTEL Math Kernel Library, NVIDIA cuDNN, EIGEN, and OpenBLAS.

The structure layer 1204 can include an ML framework 1214 and an algorithm 1216. The ML framework 1214 can be thought of as an interface, library, or tool that enables users to build and deploy the AI model. The ML framework 1214 can include an open-source library, an API, a gradient-boosting library, an ensemble method, and/or a deep learning toolkit that work with the layers of the AI system facilitate development of the AI model. For example, the ML framework 1214 can distribute processes for application or training of the AI model across multiple resources in the hardware platform 1210. The ML framework 1214 can also include a set of pre-built components that have the functionality to implement and train the AI model and enable users to use pre-built functions and classes to construct and train the AI model. Thus, the ML framework 1214 can be used to facilitate data engineering, development, hyperparameter tuning, testing, and training for the AI model. Examples of ML frameworks 1214 that can be used in the AI system 1200 include TENSORFLOW, PYTORCH, SCIKIT-LEARN, KERAS, LightGBM, RANDOM FOREST, and AMAZON WEB SERVICES.

The algorithm 1216 can be an organized set of computer-executable operations used to generate output data from a set of input data and can be described using pseudocode. The algorithm 1216 can include complex code that enables the computing resources to learn from new input data and create new/modified outputs based on what was learned. In some implementations, the algorithm 1216 can build the AI model through being trained while running computing resources of the hardware platform 1210. This training enables the algorithm 1216 to make predictions or decisions without being explicitly programmed to do so. Once trained, the algorithm 1216 can run at the computing resources as part of the AI model to make predictions or decisions, improve computing resource performance, or perform tasks. The algorithm 1216 can be trained using supervised learning, unsupervised learning, semi-supervised learning, and/or reinforcement learning.

Using supervised learning, the algorithm 1216 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of operational data in FIG. 1) from various source computing systems described in relation to FIG. 12. Furthermore, training data can include pre-processed data generated by various engines of the data watermarking platform described in relation to FIG. 12. The user may label the training data based on one or more classes and trains the AI model by inputting the training data to the algorithm 1216. The algorithm determines how to label the new data based on the labeled training data. The user can facilitate collection, labeling, and/or input via the ML framework 1214. In some instances, the user may convert the training data to a set of feature vectors for input to the algorithm 1216. Once trained, the user can test the algorithm 1216 on new data to determine if the algorithm 1216 is predicting accurate labels for the new data. For example, the user can use cross-validation methods to test the accuracy of the algorithm 1216 and retrain the algorithm 1216 on new training data if the results of the cross-validation are below an accuracy threshold.

Supervised learning can include classification and/or regression. Classification techniques include teaching the algorithm 1216 to identify a category of new observations based on training data and are used when input data for the algorithm 1216 is discrete. Said differently, when learning through classification techniques, the algorithm 1216 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1216 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1216 is continuous. Regression techniques can be used to train the algorithm 1216 to predict or forecast relationships between variables. To train the algorithm 1216 using regression techniques, a user can select a regression method for estimating the parameters of the model. The user collects and labels training data that is input to the algorithm 1216 such that the algorithm 1216 is trained to understand the relationship between data features and the dependent variable(s). Once trained, the algorithm 1216 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 1216 learns patterns from unlabeled training data. In particular, the algorithm 1216 is trained to learn hidden patterns and insights of input data, which can be used for data exploration or for generating new data. Here, the algorithm 1216 does not have a predefined output, unlike the labels output when the algorithm 1216 is trained using supervised learning. Said another way, unsupervised learning is used to train the algorithm 1216 to find an underlying structure of a set of data, group the data according to similarities, and represent that set of data in a compressed format. The data watermarking platform can use unsupervised learning to identify patterns in claim history (e.g., to identify particular event sequences) and so forth. In some implementations, performance of the data watermarking platform that can use unsupervised learning is improved because the incoming memories (e.g., operational data in FIG. 1) is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1216 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1216 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1216 include factor analysis, item response theory, latent profile analysis, and latent class analysis.

The model layer 1206 implements the AI model using data from the data layer and the algorithm 1216 and ML framework 1214 from the structure layer 1204, thus enabling decision-making capabilities of the AI system 1200. The model layer 1206 includes a model structure 1220, model parameters 1222, a loss function engine 1224, an optimizer 1226, and a regularization engine 1228.

The model structure 1220 describes the architecture of the AI model of the AI system 1200. The model structure 1220 defines the complexity of the pattern/relationship that the AI model expresses. Examples of structures that can be used as the model structure 1220 include decision trees, support vector machines, regression analyses, Bayesian networks, Gaussian processes, genetic algorithms, and artificial neural networks (or, simply, neural networks). The model structure 1220 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1220 may include one or more hidden layers of nodes between the input and output layers. The model structure 1220 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1222 represent the relationships learned during training and can be used to make predictions and decisions based on input data. The model parameters 1222 can weight and bias the nodes and connections of the model structure 1220. For instance, when the model structure 1220 is a neural network, the model parameters 1222 can weight and bias the nodes in each layer of the neural networks, such that the weights determine the strength of the nodes and the biases determine the thresholds for the activation functions of each node. The model parameters 1222, in conjunction with the activation functions of the nodes, determine how input data is transformed into desired outputs. The model parameters 1222 can be determined and/or altered during training of the algorithm 1216.

The loss function engine 1224 can determine a loss function, which is a metric used to evaluate the AI model's performance during training. For instance, the loss function engine 1224 can measure the difference between a predicted output of the AI model and the actual output of the AI model and is used to guide optimization of the AI model during training to minimize the loss function. The loss function may be presented via the ML framework 1214, such that a user can determine whether to retrain or otherwise alter the algorithm 1216 if the loss function is over a threshold. In some instances, the algorithm 1216 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cos h loss function, and quantile loss function.

The optimizer 1226 adjusts the model parameters 1222 to minimize the loss function during training of the algorithm 1216. In other words, the optimizer 1226 uses the loss function generated by the loss function engine 1224 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1226 used may be determined based on the type of model structure 1220 and the size of data and the computing resources available in the data layer 1202.

The regularization engine 1228 executes regularization operations. Regularization is a technique that prevents over- and under-fitting of the AI model. Overfitting occurs when the algorithm 1216 is overly complex and too adapted to the training data, which can result in poor performance of the AI model. Underfitting occurs when the algorithm 1216 is unable to recognize even basic patterns from the training data such that it cannot perform well on training data or on validation data. The optimizer 1226 can apply one or more regularization techniques to fit the algorithm 1216 to the training data properly, which helps constraint the resulting AI model and improves its ability for generalized application. Examples of regularization techniques include lasso (L1) regularization, ridge (L2) regularization, and elastic (L1 and L2 regularization).

The application layer 1208 describes how the AI system 1200 is used to solve problem or perform tasks. In an example implementation, the application layer 1208 can include a front-end user interface of the data watermarking platform.

Example Computing Environment of the Data Watermarking Platform

Figure 13:
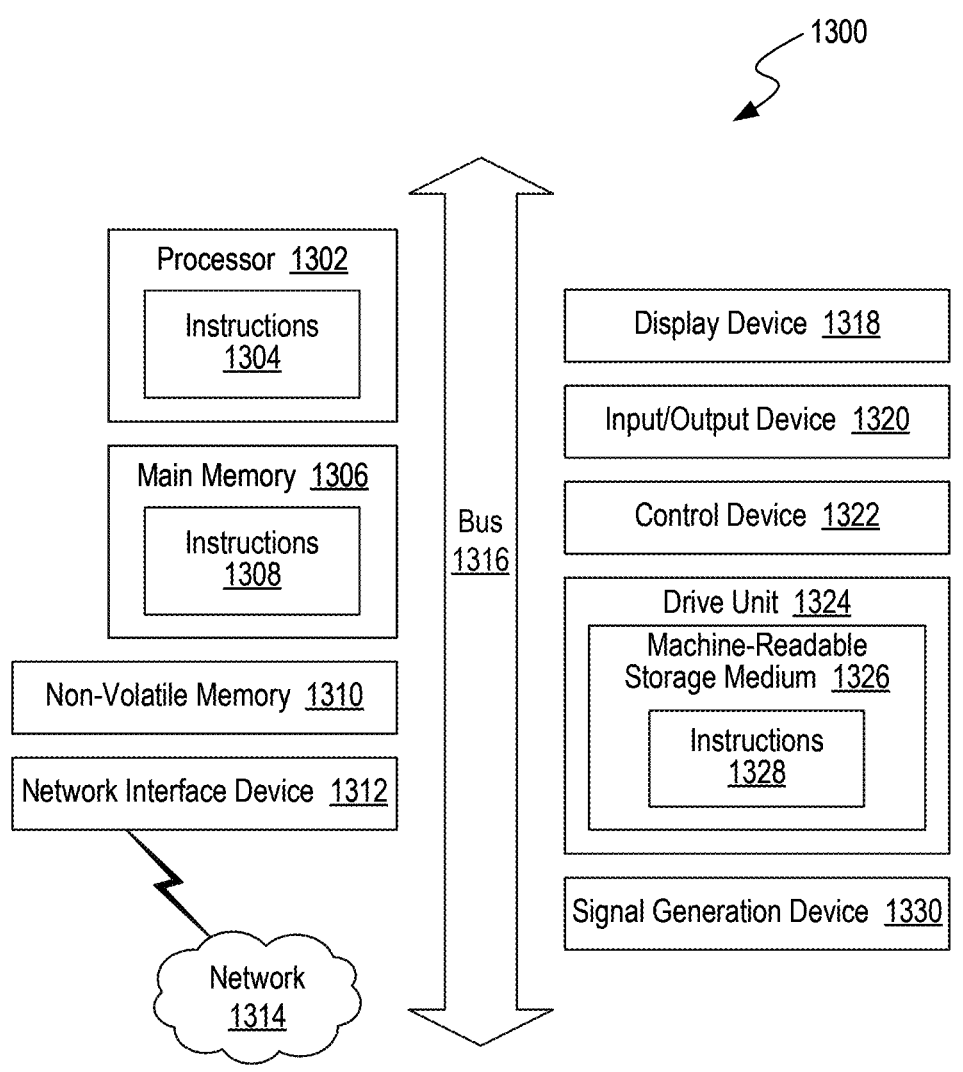
FIG. 13 is a block diagram showing some of the components typically incorporated in at least some of the computer systems and other devices on which the data watermarking platform operates, in accordance with some implementations of the present technology.

FIG. 13 is a block diagram showing some of the components typically incorporated in at least some of the computer systems 1300 and other devices on which the disclosed system operates in accordance with some implementations of the present technology. As shown, an example computer system 1300 can include: one or more processors 1302, main memory 1306, non-volatile memory 1310, a network interface device 1312, video display device 1318, an input/output device 1320, a control device 1322 (e.g., keyboard and pointing device), a drive unit 1324 that includes a machine-readable medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the figures and any other components described in this specification can be implemented.

The computer system 1300 can take any suitable physical form. For example, the computer system 1300 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1300. In some implementations, the computer system 1300 can be an embedded computer system, a system-on-chip (SOC), a single-board computer system (SBC) or a distributed system such as a mesh of computer systems or include one or more cloud components in one or more networks. Where appropriate, one or more computer systems 1300 can perform operations in real time, near real time, or in batch mode.

The network interface device 1312 enables the computer system 1300 to exchange data in a network 1314 with an entity that is external to the computing system 1300 through any communication protocol supported by the computer system 1300 and the external entity. Examples of the network interface device 1312 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable (storage) medium 1326 can include any medium that is capable of storing, encoding, or carrying a set of instructions for execution by the computer system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1308, 1328) set at various times in various memory and storage devices in computing device(s). When read and executed by the processor 1302, the instruction(s) cause the computer system 1300 to perform operations to execute elements involving the various aspects of the disclosure.

Figure 14:
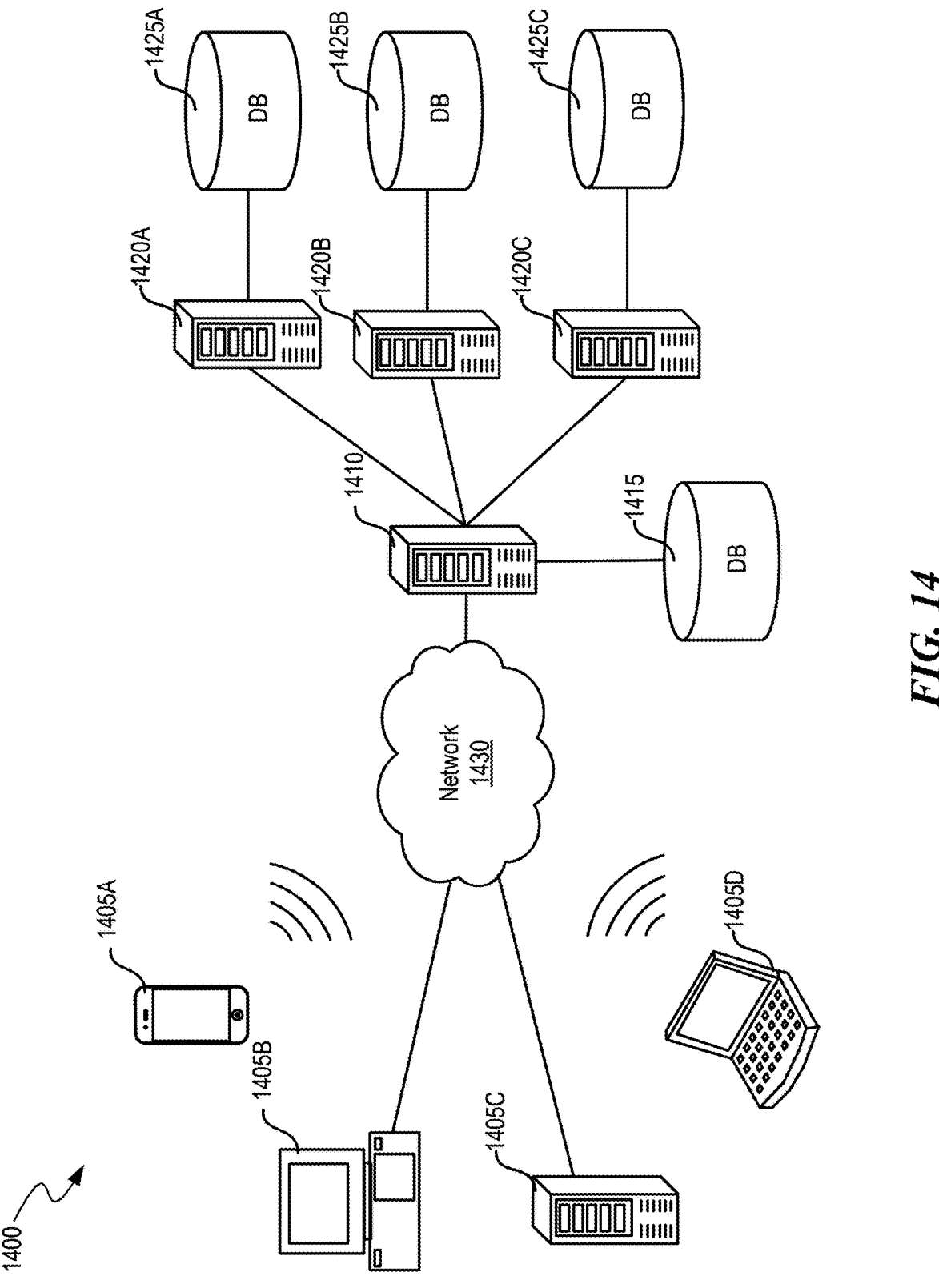
FIG. 14 is a system diagram illustrating an example of a computing environment in which the data watermarking platform operates, in accordance with some implementations of the present technology.

FIG. 14 is a system diagram illustrating an example of a computing environment in which the disclosed system operates in some implementations. In some implementations, environment 1400 includes one or more client computing devices 1405A-D, examples of which can host the data watermarking platform of FIG. 12. Client computing devices 1405 operate in a networked environment using logical connections through network 1430 to one or more remote computers, such as a server computing device.

In some implementations, server computing device 1410 is an edge server which receives client requests and coordinates fulfillment of those requests through other servers, such as servers 1420A-C. In some implementations, server computing devices 1410 and 1420 comprise computing systems, such as the data watermarking platform of FIG. 12. Though each server computing device 1410 and 1420 is displayed logically as a single server, server computing devices can each be a distributed computing environment encompassing multiple computing devices located at the same or at geographically disparate physical locations. In some implementations, each server computing device 1420 corresponds to a group of servers.

Client computing devices 1405 and server computing devices 1410 and 1420 can each act as a server or client to other server or client devices. In some implementations, servers (1410, 1420A-C) connect to a corresponding database (1415, 1425A-C). As discussed above, each server computing device 1420 can correspond to a group of servers, and each of these servers can share a database or can have its own database. Databases 1415 and 1425 warehouse (e.g., store) information such as claims data, email data, call transcripts, call logs, policy data and so on. Though databases 1415 and 1425 are displayed logically as single units, databases 1415 and 1425 can each be a distributed computing environment encompassing multiple computing devices, can be located within their corresponding server, or can be located at the same or at geographically disparate physical locations.

Network 1430 can be a local area network (LAN) or a wide area network (WAN), but can also be other wired or wireless networks. In some implementations, network 1430 is the Internet or some other public or private network. Client computing devices 1405 are connected to network 1430 through a network interface, such as by wired or wireless communication. While the connections between server computing device 1410 and server computing devices 1420 are shown as separate connections, these connections can be any kind of local, wide area, wired, or wireless network, including network 1430 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 1212(f) will begin with the words "means for," but use of the term "for" in any other context is not intended to invoke treatment under 35 U.S.C. § 1212(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions for embedding and storing a traceable watermark in multi-modal digital data stored thereon, wherein the instructions when executed by at least one data processor of a system, cause the system to:

receive an input dataset represented by at least one data modality that includes one or more of: (a) text data comprising a sequence of alphanumeric characters, (b) image data comprising an array of pixel intensity values, (c) audio data comprising a sampled digital waveform, (d) video data comprising temporally ordered image frames, or (e) structured data comprising records organized in rows and columns;

generate, for each data modality, a watermark pattern that comprises one or more parameters produced by applying a cryptographic hash function to a unique dataset identifier identifying the input dataset, wherein the one or more parameters provide instructions to watermark the input dataset;

embed each watermark pattern in the input dataset to generate a watermarked dataset by modifying one or more of: a discrete data value, a data relationship, or an arrangement of data elements within the input dataset at a location determined in accordance with the one or more parameters;

generate a hierarchical fingerprint for the watermarked dataset by generating a series of cryptographic hash identifiers over multiple portions of the watermarked dataset, comprising at least:

(a) one or more higher-level hash identifiers that each represents a first portion of the watermarked dataset at a first level of granularity, and (b) one or more lower-level hash identifiers that each represents a second portion of the watermarked dataset smaller than the first portion at a second level of granularity different from the first level of granularity, wherein the one or more lower-level hash identifiers correspond to subdivisions within the first portion represented by the one or more higher-level hash identifiers; and store each watermark pattern and the hierarchical fingerprint in a distributed database accessible to one or more authorized computing devices participating in a decentralized network.

2. The non-transitory computer-readable storage medium of claim 1, wherein the at least one data modality includes the text data, and wherein the instructions further cause the system to:

embed a respective watermark pattern by performing one or more of: (a) replacing predetermined words within the text data with synonyms selected based on the one or more parameters, (b) modifying a sentence structure of the text data in accordance with one or more transformation rules defined by the one or more parameters, or (c) inserting one or more Unicode characters in the text data at one or more positions determined by the one or more parameters.

3. The non-transitory computer-readable storage medium of claim 1, wherein the at least one data modality includes the image data or the video data, and wherein the instructions further cause the system to:

embed a respective watermark pattern by performing one or more of: (a) modifying one or more of a discrete cosine transform coefficient or a wavelet coefficient of the image data or video data based on the one or more parameters, (b) adding a frame-sequence signature in video data in accordance with a timing pattern defined by the one or more parameters, or (c) generating a hash-based identifier from the image data or video data in accordance with the one or more parameters.

4. The non-transitory computer-readable storage medium of claim 1, wherein the at least one data modality includes the audio data, and wherein the instructions further cause the system to:

embed a respective watermark pattern by performing one or more of: (a) masking a watermark signal at a particular frequency determined by the one or more parameters, or (b) modifying a phase relationship between frequency components within the audio data in accordance with a phase shift value defined by the one or more parameters.

5. The non-transitory computer-readable storage medium of claim 1, wherein the at least one data modality includes the structured data, and wherein the instructions further cause the system to:

embed a respective watermark pattern by performing one or more of: (a) modifying a numerical value within the structured data in accordance with a statistical distribution defined by the one or more parameters, or (b) inserting one or more generated data records in the structured data at a position determined by the one or more parameters.

6. The non-transitory computer-readable storage medium of claim 1, wherein the distributed database is a distributed ledger.

7. A computer-implemented method for embedding and storing a traceable watermark in multi-modal digital data, the computer-implemented method comprising:

obtaining an input dataset represented by at least one data modality that includes one or more of: (a) text data, (b) image data, (c) audio data, (d) video data, or (e) structured data;

generating, for each data modality, a watermark pattern that comprises one or more parameters produced by applying a cryptographic hash function to a unique dataset identifier identifying the input dataset, wherein the one or more parameters provide instructions to watermark the input dataset;

embedding each watermark pattern in the input dataset to generate a watermarked dataset by modifying a portion of the input dataset at a location determined in accordance with the one or more parameters;

generating a hierarchical fingerprint for the watermarked dataset by generating a series of cryptographic hash identifiers over multiple portions of the watermarked dataset, including at least:

(a) one or more higher-level hash identifiers that each represents a first portion of the watermarked dataset at a first level of granularity, and (b) one or more lower-level hash identifiers that each represents a second portion of the watermarked dataset smaller than the first portion at a second level of granularity different from the first level of granularity, wherein the one or more lower-level hash identifiers correspond to subdivisions within the first portion represented by the one or more higher-level hash identifiers; and storing each watermark pattern and the hierarchical fingerprint in a distributed database accessible to one or more authorized computing devices participating in a decentralized network.

8. The computer-implemented method of claim 7, wherein the computer-implemented method further comprises:

deploying one or more crawler nodes configured to scan one or more websites to identify observed watermarked content, and applying one or more inverse transformations to the observed watermarked content, wherein the one or more inverse transformations are configured to generate the input dataset using the watermarked dataset.

9. The computer-implemented method of claim 7, wherein the computer-implemented method further comprises:

matching one or more observed watermark patterns against the generated watermark pattern by generating a similarity score between the one or more observed watermark patterns and the generated watermark pattern.

10. The computer-implemented method of claim 7, wherein the computer-implemented method further comprises:

modifying the one or more parameters used to generate watermark patterns based on one or more observed attack patterns determined using previously watermarked datasets.

11. The computer-implemented method of claim 7, wherein the hierarchical fingerprint includes one or more of:

a dataset-level fingerprint that represents the watermarked dataset, a segment-level fingerprint that represents a portion within each data modality of the watermarked dataset, or a record-level fingerprint that represents an individual data entry of the watermarked dataset.

12. The computer-implemented method of claim 7, wherein the hierarchical fingerprint is generated by combining fingerprint data from multiple data modalities into composite fingerprint structure.

13. The computer-implemented method of claim 7, wherein the computer-implemented method further comprises:

correlate watermarks across the at least one data modality by identifying one or more associations between a respective watermark pattern embedded in the at least one data modality of the input dataset.

14. The method of claim 7, wherein the input dataset is represented by at least two data modalities that includes two or more of: (a) text data, (b) image data, (c) audio data, (d) video data, or (e) structured data.

15. A system comprising:

at least one hardware processor; and at least one non-transitory memory storing instructions, which, when executed by the at least one hardware processor, cause the system to:

accessing an input dataset represented by at least one data modality that includes one or more of: (a) text data, (b) image data, (c) audio data, (d) video data, or (e) structured data;

determining, for each data modality, a watermark pattern that comprises one or more parameters produced by applying a cryptographic hash function to a dataset identifier identifying the input dataset;

embedding each watermark pattern in the input dataset to generate a watermarked dataset by modifying a portion of the input dataset at a location determined in accordance with the one or more parameters;

generating a hierarchical fingerprint for the watermarked dataset by generating a series of cryptographic hash identifiers over multiple portions of the watermarked dataset, including at least:

(a) one or more higher-level hash identifiers that each represents a first portion of the watermarked dataset at a first level of granularity, and (b) one or more lower-level hash identifiers that each represents a second portion of the watermarked dataset smaller than the first portion at a second level of granularity different from the first level of granularity, wherein the one or more lower-level hash identifiers correspond to subdivisions within the first portion represented by the one or more higher-level hash identifiers; and storing each watermark pattern and the hierarchical fingerprint in a database accessible to one or more computing devices.

16. The system of claim 15, wherein the at least one non-transitory memory storing instructions further cause the system to:

use an artificial intelligence model to modify the one or more parameters based on observed attack patterns configured to remove one or more watermark patterns.

17. The system of claim 16, wherein the artificial intelligence model is an agentic artificial intelligence model.

18. The system of claim 15, wherein each cryptographic hash identifier is generated by applying a particular cryptographic hash function to corresponding portions of the watermarked dataset.

19. The system of claim 15, wherein the database is a federated ledger comprising multiple ledger nodes operated by different computing devices, and wherein each ledger node maintains a record of each watermark pattern and the hierarchical fingerprint.

20. The system of claim 19, wherein each ledger node is configured to cryptographically sign a consensus vote to add the record to the federated ledger.

\* \* \* \* \*